US008441677B2

(12) United States Patent
Zengo et al.

(10) Patent No.: US 8,441,677 B2
(45) Date of Patent: May 14, 2013

(54) VELOCITY CALCULATION DEVICE, IMAGE FORMING APPARATUS, AND COMPUTER READABLE STORAGE MEDIUM

(75) Inventors: Takeshi Zengo, Kanagawa (JP); Hiroaki Satoh, Kanagawa (JP); Susumu Kibayashi, Kanagawa (JP); Toru Nishida, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 523 days.

(21) Appl. No.: 12/726,500

(22) Filed: Mar. 18, 2010

(65) Prior Publication Data

US 2011/0032543 A1 Feb. 10, 2011

(30) Foreign Application Priority Data

Aug. 6, 2009 (JP) ................. 2009-183547

(51) Int. Cl.
*G06F 15/00* (2006.01)
*G06K 1/00* (2006.01)
*G06K 15/10* (2006.01)
(52) U.S. Cl.
USPC ........................................... 358/1.5; 358/1.8
(58) Field of Classification Search ................. 358/1.5, 358/1.7, 1.8, 1.12
See application file for complete search history.

(56) References Cited

U.S. PATENT DOCUMENTS

| 4,933,867 | A | 6/1990 | Ishigaki | |
|---|---|---|---|---|
| 8,033,546 | B2 * | 10/2011 | Takahashi et al. | 271/270 |
| 2007/0103496 | A1 | 5/2007 | Otani | |

FOREIGN PATENT DOCUMENTS

| JP | 59-220384 | 12/1984 |
|---|---|---|
| JP | 3-002068 | 1/1991 |
| JP | 3-296621 | 12/1991 |
| JP | 3129810 | 1/2001 |
| JP | 2004-195785 | 7/2004 |
| JP | 2007-145008 | 6/2007 |
| JP | 2007-301768 | 11/2007 |

* cited by examiner

*Primary Examiner* — Douglas Tran
(74) *Attorney, Agent, or Firm* — Fildes & Outland, P.C.

(57) ABSTRACT

A velocity calculation device disclosed includes a computation section that, using as a reference period at each of plural predetermined points in time a individual period detected most recently by a detection section for one or another of plural generating sections, computes for each of the reference periods an average value of the reference period and one or more individual periods for other generating sections of the plural generating sections, detected separately prior to detecting the respective reference period for pulse signals nearest to the reference period; and a calculation section that calculates a velocity related to rotation of the rotation body based on the plural average values computed by the computation section, the number of individual generating sections, and a predetermined rotation angle.

6 Claims, 17 Drawing Sheets

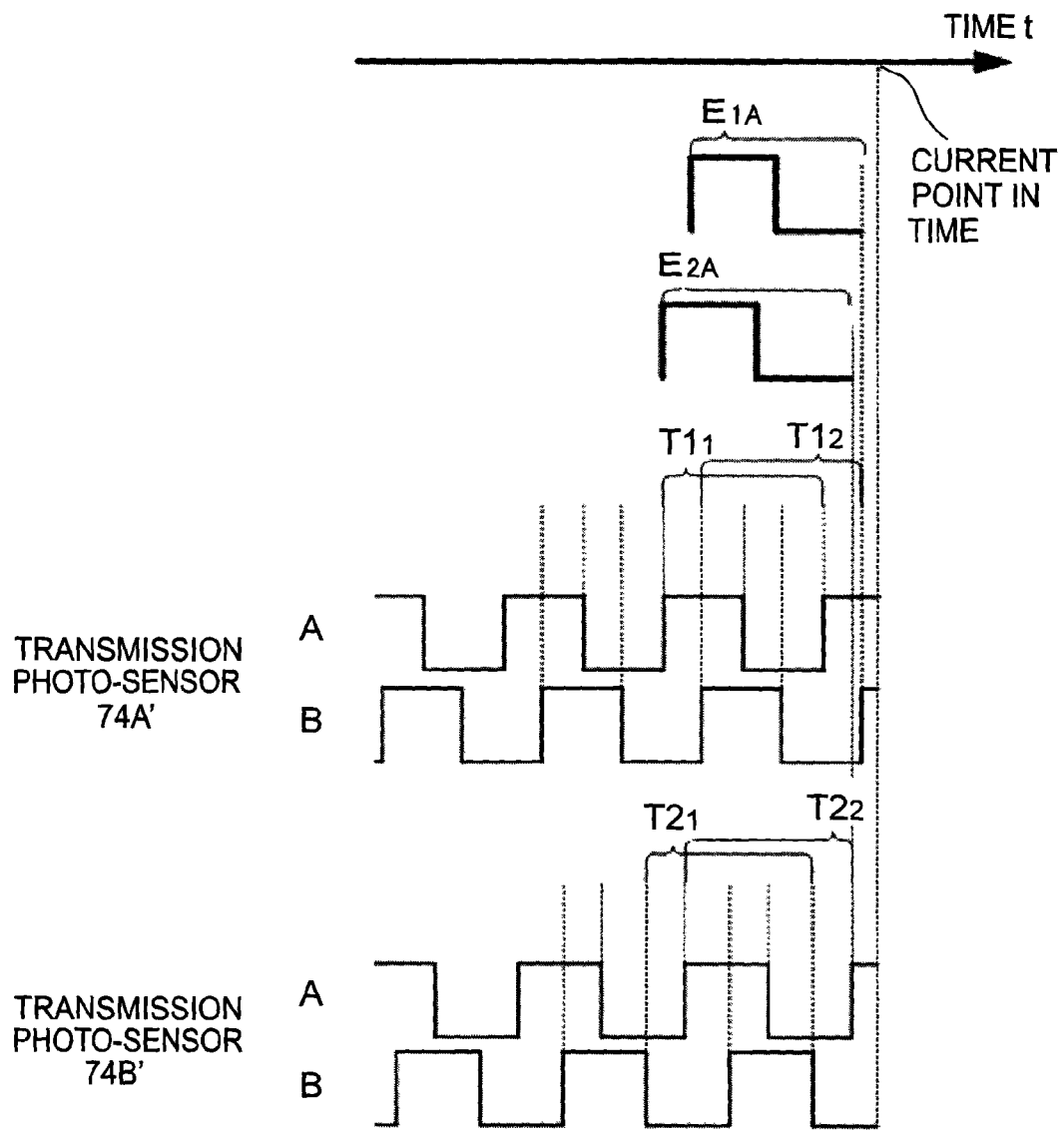

US 8,441,677 B2

VELOCITY CALCULATION DEVICE, IMAGE FORMING APPARATUS, AND COMPUTER READABLE STORAGE MEDIUM

CROSS-REFERENCE TO RELATED APPLICATION

This application claims priority under 35 USC 119 from Japanese Patent Application No. 2009-183547 filed on Aug. 6, 2009.

BACKGROUND

Technical Field

The present invention relates to a velocity calculation device, an image forming apparatus, and a computer readable storage medium.

SUMMARY

According to aspect of the invention, there is provided a velocity calculation device, including:

a rotation body provided with plural detected portions disposed along a rotation direction at predetermined rotation angle intervals;

plural generating sections that each respectively generate a pulse signal according to passing of each of the plural detected portions accompanying rotation of the rotation body;

a detection section that detects as individual periods, based on each of the pulse signals generated by the plural generating sections, periods of each of the pulse signals of the plural generating sections;

a computation section that, using as a reference period at each of plural predetermined points in time the individual period detected most recently by the detection section for one or other of the plural generating sections, computes for each of the reference periods an average value of the reference period and one or more individual periods for other generating sections of the plural generating sections, detected separately prior to detecting the respective reference period for pulse signals nearest to the reference period; and a calculation section that calculates a velocity related to rotation of the rotation body based on the plural average values computed by the computation section, the number of individual generating sections, and the predetermined rotation angle.

BRIEF DESCRIPTION OF THE DRAWINGS

Exemplary embodiments of the present invention will be described in detail based on the following figures, wherein:

FIG. 19 is a timing chart showing waveforms of pulse signals generated by each transmission photo-sensor according to another exemplary embodiment.

DETAILED DESCRIPTION

A detailed explanation is given below of an exemplary embodiment for realizing the present invention, with reference to the drawings.

First Exemplary Embodiment

Figure 1:
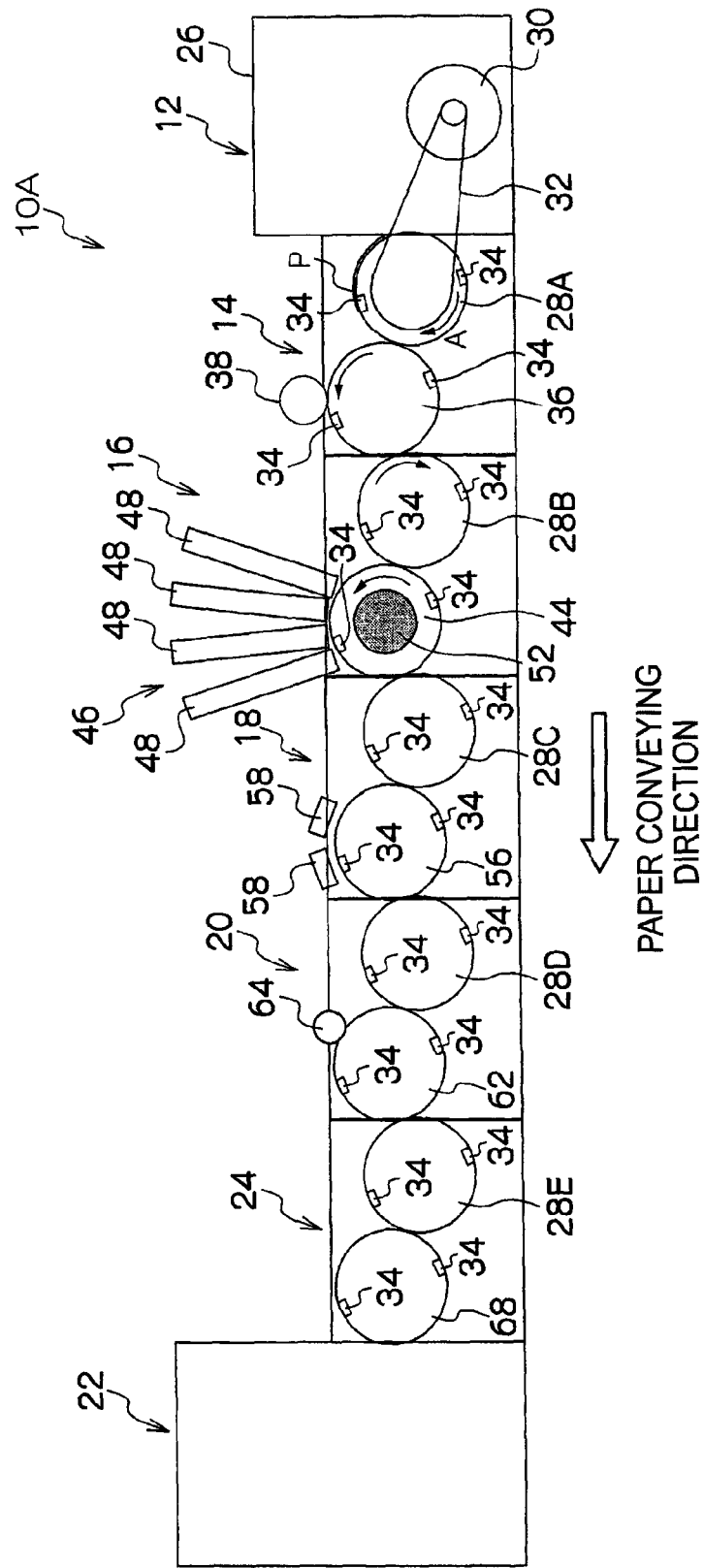
FIG. 1 is a side view showing a configuration of an image forming apparatus according to first to fourth exemplary embodiments.

FIG. 1 is a side view showing a configuration of an image forming apparatus 10A according to a first exemplary embodiment. As shown in FIG. 1, a paper feeder conveying section 12 is provided in the image forming apparatus 10A, for feeding and conveying recording paper P that serves as a recording medium. At the recording paper P conveying direction downstream side of the paper feeder conveying section 12 are provided, in the following sequence along the conveying direction: a processing liquid application section 14 that applies to the recording face (surface) of the recording paper P a processing liquid that reacts with ink, in order to aggregate coloring matter (for example pigment) and promote separation of coloring matter and solvent; an image forming section 16 that forms an image on the recording face of the recording paper P; a drying section 18 that dries the image formed on the recording face; an image fixing section 20 that fixes the dried image onto the recording paper P; and a discharge conveying section 24 that conveys the image-fixed recording paper P to a discharge section 22.

The paper feeder conveying section 12 is equipped with a storage section 26 in which recording paper P is stored. A motor 30 is provided to the storage section 26. A paper feeding device (not shown in the figures) is further provided to the storage section 26, and the recording paper P is fed out by the paper feeding device from the storage section 26 towards the processing liquid application section 14.

The processing liquid application section 14 is equipped with an intermediate conveying drum 28A and a processing liquid application drum 36. The intermediate conveying drum 28A is rotatably disposed in a region sandwiched between the storage section 26 and the processing liquid application drum 36, and a belt 32 is entrained around a rotation shaft of the intermediate conveying drum 28A and a rotation shaft of the motor 30. Consequently, rotation driving force of the motor 30 is transmitted to the intermediate conveying drum 28A via the belt 32, thereby rotating the intermediate conveying drum 28A in the direction of arrow A.

Retaining members 34 are provided to the intermediate conveying drum 28A, with leading ends of the retaining members 34 nipping the recording paper P and retaining the recording paper P. Consequently, the recording paper P fed out from the storage section 26 towards the processing liquid application section 14, is retained on the outer peripheral face of the intermediate conveying drum 28A by the retaining members 34, and conveyed towards the processing liquid application drum 36 by rotation of the intermediate conveying drum 28A.

Note that, similar to provision to the intermediate conveying drum 28A, retaining members 34 are also provided to intermediate conveying drums 28B to 28E, the processing liquid application drum 36, an image forming drum 44, an ink drying drum 56, an image fixing drum 62, and a discharge conveying drum 68, these being described below. The recording paper P is passed across from a drum on the upstream side to a drum on the downstream side by means of these retaining members 34.

The rotation shaft of the processing liquid application drum 36 is connected to the rotation shaft of the intermediate conveying drum 28A by gears (not shown in the figures), receives rotational force from the intermediate conveying drum 28A, and rotates.

The recording paper P conveyed by the intermediate conveying drum 28A is passed across to the processing liquid application drum 36 via the retaining members 34 of the processing liquid application drum 36, and conveyed in a retained state on the outer peripheral face of the processing liquid application drum 36.

A processing liquid application roller 38 is disposed above the processing liquid application drum 36 in a state of contact with the outer peripheral face of the processing liquid application drum 36. Processing liquid is applied by the processing liquid application roller 38 to the recording face of the recording paper P disposed on the outer peripheral face of the processing liquid application drum 36.

The recording paper P, to which the processing liquid has been applied by the processing liquid application section 14, is conveyed towards the image forming section 16 by rotation of the processing liquid application drum 36.

The image forming section 16 is equipped with the intermediate conveying drum 28B and the image forming drum 44. The rotation shaft of the intermediate conveying drum 28A is connected to the rotation shaft of the processing liquid application drum 36 by gears (not shown in the figures), receives rotational force from the processing liquid application drum 36, and rotates.

The recording paper P, conveyed by the processing liquid application drum 36, is passed across to the intermediate conveying drum 28B via the retaining members 34 of the intermediate conveying drum 28B of the image forming section 16, and is conveyed in a retained state on the outer peripheral face of the intermediate conveying drum 28B.

The rotation shaft of the image forming drum 44, serving as an image conveying section, is connected to the rotation shaft of the intermediate conveying drum 28B by gears (not shown in the figures), receives rotational force from the intermediate conveying drum 28B, and rotates.

The recording paper P, conveyed by the intermediate conveying drum 28B, is passed across to the image forming drum 44 via the retaining members 34 of the image forming drum 44, and conveyed in a retained state on the outer peripheral face of the image forming drum 44.

A head unit 46 is disposed above the image forming drum 44, in close proximity to the outer peripheral face of the image forming drum 44. The head unit 46 is provided with four inkjet recording heads 48, serving as four recording heads, corresponding to each of four colors, yellow (Y), magenta (M), cyan (C), and black (K). The inkjet recording heads 48 are arrayed along the peripheral direction of the image forming drum 44, so as to form an image by ejecting ink droplets from nozzles 48a, synchronized with a clock signal of a CPU 100, described below, such that the image is superimposed on the processing liquid layer formed on the recording face of the recording paper P by the processing liquid application section 14.

The image forming drum 44 is equipped with a rotary encoder 52, described in detail below. Accompanying rotation of the image forming drum 44, the rotary encoder 52 generates a pulse signal for detecting a predetermined rotation reference position of the image forming drum 44, and a pulse signal for detecting the angle of rotation from the predetermined rotation reference position of the image forming drum 44.

The recording paper P, formed with an image on the recording face by the image forming section 16, is conveyed towards the drying section 18 by rotation of the image forming drum 44.

The drying section 18 is equipped with the intermediate conveying drum 28C and the ink drying drum 56. The rotation shaft of the intermediate conveying drum 28C is connected to the rotation shaft of the image forming drum 44 through gears (not shown in the figures), receives rotational force from the image forming drum 44, and rotates.

The recording paper P conveyed by the image forming drum 44 is passed across to the intermediate conveying drum 28C via the retaining members 34 of the intermediate conveying drum 28C, and conveyed in a retained state on the outer peripheral face of the intermediate conveying drum 28C.

The rotation shaft of the ink drying drum 56 is connected to the rotation shaft of the intermediate conveying drum 28C through gears (not shown in the figures), receives rotational force from the intermediate conveying drum 28C, and rotates.

The recording paper P, conveyed by the intermediate conveying drum 28C, is passed across to the ink drying drum 56 by the retaining member 34 of the ink drying drum 56, and is conveyed in a retained state on the outer peripheral face of the ink drying drum 56.

A warm air heater 58 is disposed above the ink drying drum 56, in close proximity to the outer peripheral face of the ink drying drum 56. Excess solvent in the image formed on the recording paper P is removed by warm air from the warm air heater 58. The recording paper P, whose image on the recording face has been dried by the drying section 18, is conveyed towards the image fixing section 20 by rotation of the ink drying drum 56.

The image fixing section 20 is equipped with the intermediate conveying drum 28D and the image fixing drum 62. The rotation shaft of the intermediate conveying drum 28D is connected to the rotation shaft of the ink drying drum 56 through gears (not shown in the figures), receives rotational force from the ink drying drum 56, and rotates.

The recording paper P conveyed by the ink drying drum 56 is passed across to the intermediate conveying drum 28D via the retaining members 34 of the intermediate conveying drum 28D, and conveyed in a retained state on the outer peripheral face of the intermediate conveying drum 28D.

The rotation shaft of the image fixing drum 62 is connected to the rotation shaft of the intermediate conveying drum 28D through gears (not shown in the figures), receives rotational force from the intermediate conveying drum 28D, and rotates.

The recording paper P, conveyed by the intermediate conveying drum 28D, is passed across to the image fixing drum 62 via the retaining members 34 of the image fixing drum 62, and conveyed in a retained state on the outer peripheral face of the image fixing drum 62.

A fixing roller 64 with an internal heater is disposed above the image fixing drum 62, in a state such that press-contact can be made with, or separated from, the outer peripheral face of the image fixing drum 62. The recording paper P that is retained on the outer peripheral face of the image fixing drum 62 is nipped between the outer peripheral face of the image fixing drum 62 and the outer peripheral face of the fixing roller 64. The coloring matter of the image formed on the recording face of the recording paper P is fused to the recording paper P by being in a state of press-contact with the outer peripheral face of the fixing roller 64 and heating with the above heater, thereby fixing the image onto the recording paper P. The recording paper P, whose image has been fixed by the image fixing section 20, is conveyed towards the discharge conveying section 24 by rotation of the image fixing drum 62.

The discharge conveying section 24 is equipped with the intermediate conveying drum 28E and the discharge conveying drum 68. The rotation shaft of the intermediate conveying drum 28E is connected to the rotation shaft of the image fixing drum 62 through gears (not shown in the figures), receives rotational force from the image fixing drum 62, and rotates.

The recording paper P, conveyed by the image fixing drum 62, is passed across to the intermediate conveying drum 28E via the retaining members 34 of the intermediate conveying drum 28E, and is conveyed in a retained state on the outer peripheral face of the intermediate conveying drum 28E.

The rotation shaft of the discharge conveying drum 68 is connected to the rotation shaft of the intermediate conveying drum 28E through gears (not shown in the figures), receives rotational force from the intermediate conveying drum 28E, and rotates.

The recording paper P, conveyed by the intermediate conveying drum 28E, is passed across to the discharge conveying drum 68 via the retaining members 34 of the discharge conveying drum 68, and is conveyed towards the discharge section 22 in a retained state on the outer peripheral face of the discharge conveying drum 68.

Figure 2:
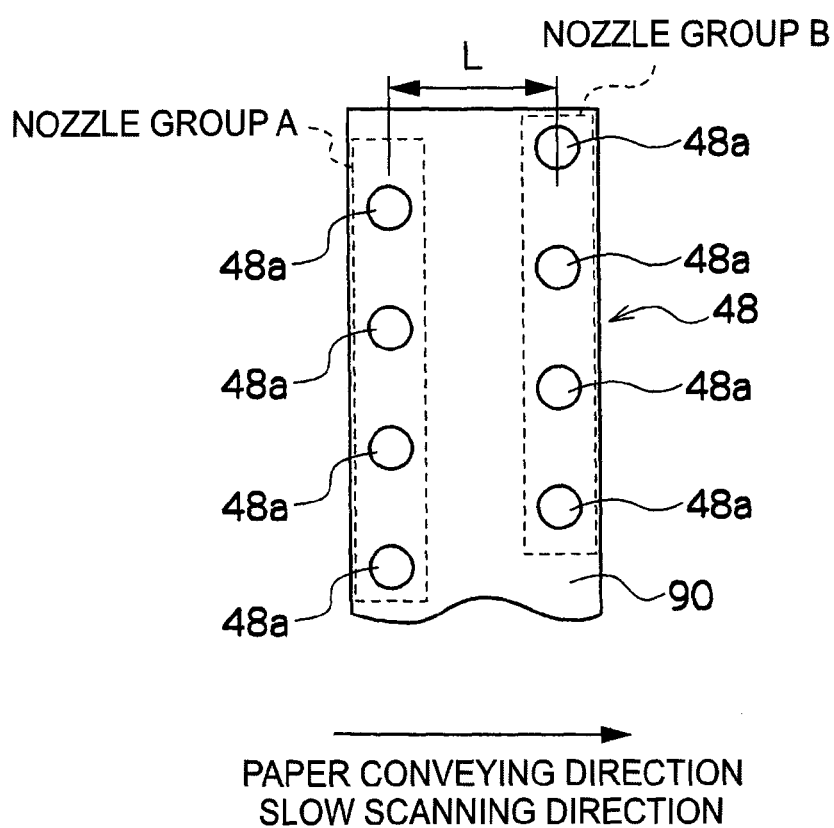
FIG. 2 is a face-on view showing a structure of an ink ejection aperture face side of an inkjet recording head according to an exemplary embodiment.

FIG. 2 is a face-on view showing a structure of an ink ejection aperture face side of each of the inkjet recording heads 48 according to the present first exemplary embodiment. As shown in FIG. 2, in the inkjet recording head 48, plural of the nozzles 48a are formed to a face 90 that faces the outer peripheral face of the image forming drum 44, with each of the nozzles 48a serving as an image forming element that ejects ink droplets. Each of the inkjet recording heads 48 is a structure in which the nozzles 48a are disposed in a two-dimensional pattern (in the present first exemplary embodiment a staggered matrix shape) in which the plural nozzles 48a do not overlap with each other along the conveying direction (slow scanning direction) of the recording paper P by the image forming drum 44. A higher density is thereby achieved in the effective nozzle separation projected (projected nozzle pitch) by placing the nozzles 48a in rows along the head length direction (the direction perpendicular to the conveying direction of the recording paper P by the image forming drum 44 (referred to below simply as "conveying direction")) in this manner.

Note that in the inkjet recording heads 48 according to the present first exemplary embodiment, the plural nozzles 48a are disposed at predetermined intervals, arrayed in a nozzle group A positioned at the upstream side in the conveying direction, and a nozzle group B, positioned at the conveying direction downstream side and disposed such that each of the nozzles 48a of the nozzle group B is positioned between nozzles 48a of the nozzle group A.

Figure 3:
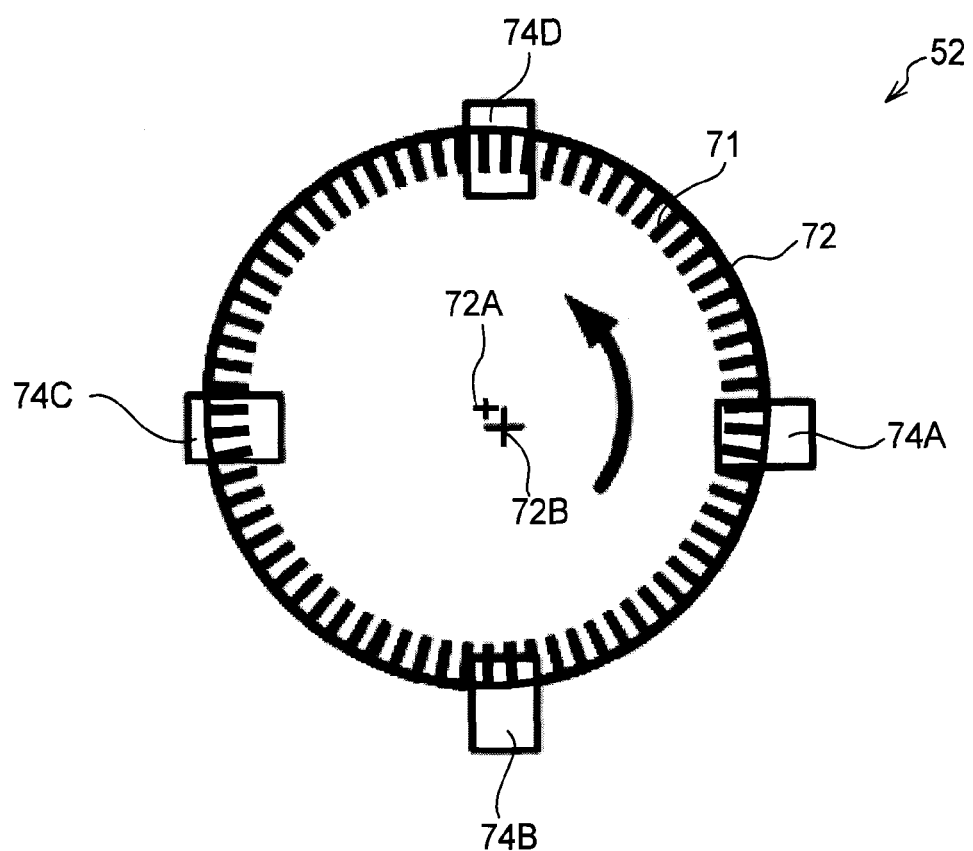
FIG. 3 is a configuration diagram showing a configuration of a rotary encoder according to an exemplary embodiment.

FIG. 3 is a configuration diagram showing a configuration of the rotary encoder 52. As shown in FIG. 3, the rotary encoder 52 is configured including: a circular plate-shaped code wheel 72, serving as a rotation body, fixed to the image forming drum 44 such that the center portion of the code wheel 72 is positioned at the center portion of the image forming drum 44, the code wheel 72 being formed with plural slits 71, serving as detected portions, disposed at substantially even intervals along the peripheral direction of the code wheel 72 and extending outwards in a radial pattern from the center portion of the code wheel 72; and transmission photo-sensors 74A to 74D, serving as generating sections that detect the slits 71 and generate pulse signals. The transmission photo-sensors 74A to 74D (note that where discrimination is not made between the transmission photo-sensors 74A to 74D they are referred to as "transmission photo-sensors 74") are each fixed to a casing (not shown in the figures) of the image forming apparatus 10A so as to correspond with respective positions at predetermined intervals along the peripheral direction of the code wheel 72, such as, for example, positions corresponding to quarter segments points of a circular arc, and each is configured such that a light emitting element and a light receiving element are disposed facing each other with the code wheel 72 interposed therebetween.

Note that in the present first exemplary embodiment, any misalignment of the center 72A of the code wheel 72 attached to the image forming drum 44, with respect to the axial center 72B of the rotation shaft that rotates the image forming drum 44 due to transmitted rotation driving force of the motor 30, is referred to as "code wheel 72 eccentricity", and any misalignment of the center of the image forming drum 44 with respect to the axial center 72B of the rotation shaft is referred to as "image forming drum 44 eccentricity".

In the present first exemplary embodiment, the separation between adjacent of the slits 71 formed in the code wheel 72 corresponds to a reference rotation angle $\Theta_0$ of the code wheel 72 (for example 1.257 milliradians.

In addition, while not shown in the figures, a reference slit is provided in the code wheel 72 further towards the central portion of the code wheel 72 than the plural slits 71, for detecting the rotation reference position of the code wheel 72 that is equivalent to a predetermined rotation reference position of the image forming drum 44. A transmission photo-sensor, separate to the transmission photo-sensors 74A to 74D, is also provided to the casing of the image forming apparatus 10A, in order to detect this reference slit.

In the present first exemplary embodiment, pairs of transmission photo-sensors are disposed at a position where, if there is eccentricity present in the code wheel 72, a pulse period gets greater and at a position where the pulse period gets smaller, namely disposed at facing positions on each side of the axial center 72B, with two sets of pairs separated by a specific interval (0°, 90°).

Figure 4:
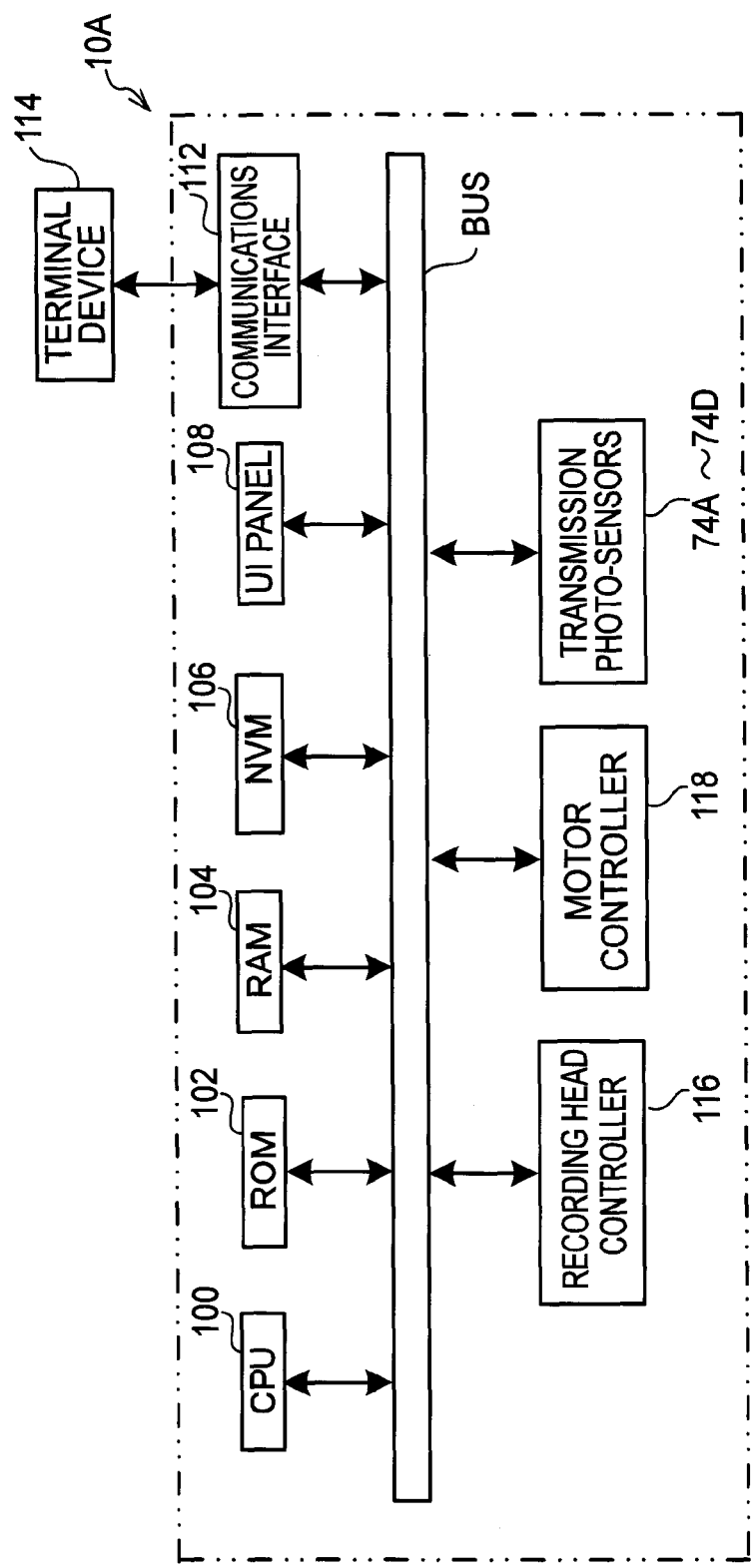
FIG. 4 is a block diagram showing relevant parts of a configuration of an electrical system of an image forming apparatus according to the first to the fourth exemplary embodiments.

FIG. 4 is a block diagram showing relevant portions of a configuration of an electrical system of the image forming apparatus 10A according to the present first exemplary embodiment.

As shown in FIG. 4, the image forming apparatus 10A is configured including: a Central Processor Unit (CPU) 100, a Read Only Memory (ROM) 102, a Random Access Memory (RAM) 104, a Non Volatile Memory (NVM) 106, a User Interface (UI) panel 108, and a communications interface 112. In the present first exemplary embodiment, the device configured by the rotary encoder 52, the CPU 100, the ROM 102, and the RAM 104 corresponds to the velocity calculation device that calculates the velocity related to rotation of the code wheel 72.

The CPU 100 controls operation of the image forming apparatus 10A overall. The ROM 102 is a storage medium pre-stored with, for example, a control program for controlling operation of the image forming apparatus 10A, an image forming processing program, described below, various parameters and the like. The RAM 104 is a storage medium employed, for example, as a work area when executing various programs, and the like. The NVM 106 is a non-volatile storage medium that stores, for example, various data that needs to be retained even when the device power switch is switched off.

The UI panel 108 is configured, for example, from a touch panel display or the like, having a transmission touch panel superimposed on a display. Various information is displayed on the display face of the display, and desired data and instructions are input by a user touching the touch panel.

The communications interface 112 is connected to a terminal device 114, such as, for example, a personal computer. The communications interface 112 both receives various data from the terminal device 114 (for example image data expressing an image for forming on the recording paper P), and transmits various data to the terminal device 114 (for example data expressing an operation state of the image forming apparatus 10A).

The CPU 100, the ROM 102, the RAM 104, the NVM 106, the UI panel 108 and the communications interface 112 are mutually connected together by a bus, BUS, such as a system bus. Consequently, the CPU 100 accesses the ROM 102, the RAM 104 and the NVM 106, displays various data on the UI panel 108, ascertains the content of operation instructions by a user to the UI panel 108, receives various data from the terminal device 114 via the communications interface 112, and transmits various types of data to the terminal device 114 via the communications interface 112.

The image forming apparatus 10A is also equipped with a recording head controller 116 and a motor controller 118.

The recording head controller 116 controls the operation of the inkjet recording heads 48 according to instructions from the CPU 100. The motor controller 118 controls the operation of the motor 30.

The recording head controller 116 and the motor controller 118 are also both connected to the BUS. Consequently, the CPU 100 controls the operation of the recording head controller 116 and the motor controller 118.

Furthermore, the above transmission photo-sensors 74A to 74D are also connected to the BUS. Consequently, the CPU 100 performs each of controlling the operation of the transmission photo-sensors 74A to 74D, ascertaining the operational state (for example, the pulse signal generation state) of the transmission photo-sensors 74A to 74D, and receiving the pulse signals generated by each of the transmission photo-sensors 74A to 74D.

Explanation follows of operation of the image forming apparatus 10A according to the present first exemplary embodiment.

The image forming apparatus 10A according to the present first exemplary embodiment feeds out the recording paper P from the storage section 26 towards the intermediate conveying drum 28A using the paper feeding device. The recording paper P is conveyed towards the image forming drum 44 via the intermediate conveying drum 28A, the processing liquid application drum 36 and the intermediate conveying drum 28B, and then retained on the outer peripheral face of the image forming drum 44. Based on image data, ink droplets are then ejected from the nozzles 48a of the inkjet recording heads 48, onto the recording paper P retained on the image forming drum 44. An image expressed by the above image data is thereby formed on the recording paper P.

Figure 5:
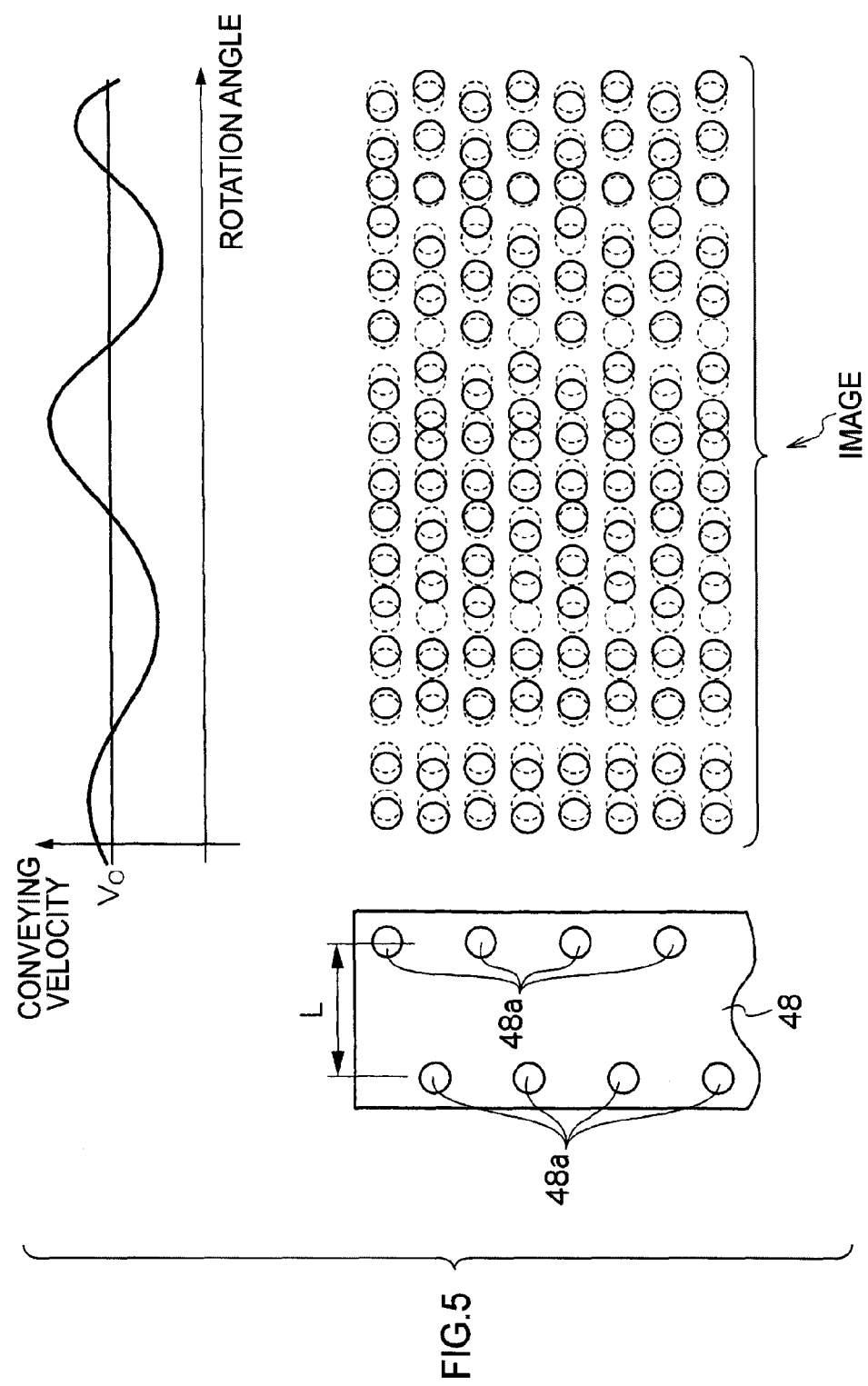
FIG. 5 is an schematic diagram showing an example of fluctuations in conveying velocity with increasing rotation angle of an image forming drum in an image forming apparatus according to the first to the fourth exemplary embodiments, and showing an example of a state of change in the impact positions of ink droplets due to the fluctuations.

By the way, the conveying velocity of the recording paper P retained on the outer peripheral face of the image forming drum 44 fluctuates, due to, for example, image forming drum 44 eccentricity, and an example thereof is shown in the graph of FIG. 5. In the graph of FIG. 5 the vertical axis represents the conveying velocity of the recording paper P on the image forming drum 44, and the horizontal axis shows the angle of rotation from the predetermined rotation reference position of the image forming drum 44. The impact positions of formed ink dots, serving as configuration units configuring an image, are shown as continuous circles aligned with the graph of FIG. 5. The circles shown with broken lines show an example of the impact positions of ink droplets ejected from each of the nozzles 48a in a case where there is no image forming drum 44 eccentricity present (when the conveying velocity of the recording paper P is velocity $V_0$). The circles shown with solid lines in the image of FIG. 5 show an example of the impact positions of ink droplets ejected from each of the nozzles 48a in a case where image forming drum 44 eccentricity is present.

In a state like this, where the conveying velocity of the recording paper P on the image forming drum 44 fluctuates, if ink droplets are ejected from each of the nozzles 48a, then the impact positions of the ink droplets are misaligned. The rotary encoder 52 is attached to the image forming drum 44 in order to suppress this effect, and a pulse signal according to the conveying velocity of the recording paper P retained on the outer peripheral face of the image forming drum 44 is generated by the rotary encoder 52. This pulse signal is output to the inkjet recording heads 48, synchronization is made to the conveying velocity of the recording paper P, and ink droplet are ejected from the nozzles 48a, forming an image.

In the image forming apparatus 10A according to the present first exemplary embodiment, the rotary encoder 52 is employed for detecting fluctuations in the conveying velocity of the recording paper P, namely detecting velocity fluctuations of the image forming drum 44. However, when attaching the code wheel 72 configuring the rotary encoder 52, if attachment is made with the center 72A of the code wheel 72 misaligned with respect to the axial center 72B of the rotation shaft of the image forming drum 44, then velocity fluctuations of the image forming drum 44 are not correctly detected, and detection is made of a velocity including a component of the eccentricity of the code wheel 72. In order to address this issue, in the image forming apparatus 10A according to the present first exemplary embodiment, by reducing detection error due to eccentricity of the code wheel 72 by employing plural of the transmission photo-sensors 74, the image forming processing is executed to form an image on the recording paper P while suppressing distortion of the image due to image forming drum 44 eccentricity.

Figure 6:
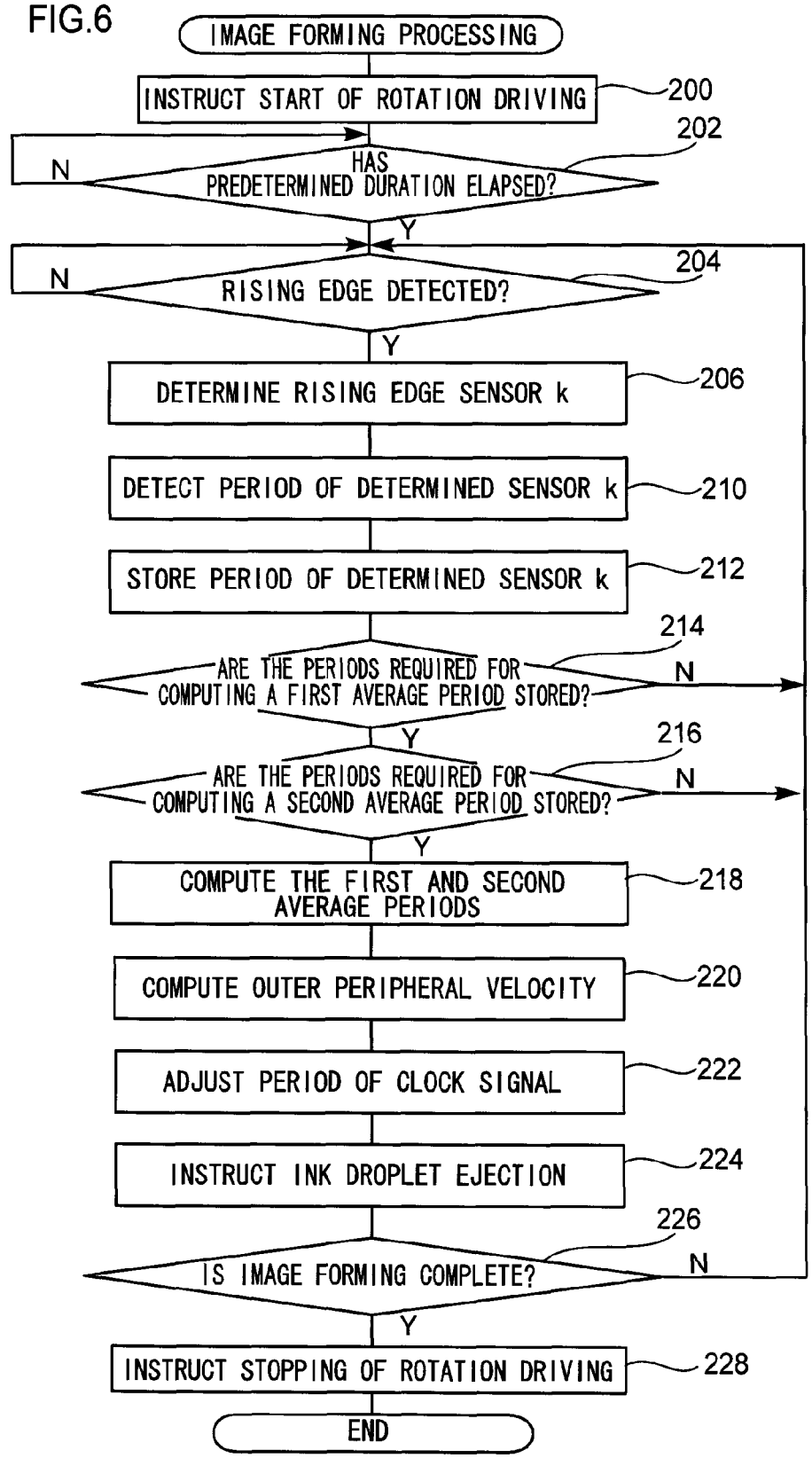
FIG. 6 is a flow chart showing the process flow of an image forming processing program according to the first exemplary embodiment.

Explanation follows of the operation of the image forming apparatus 10A when executing image forming processing, with reference to FIG. 6. FIG. 6 is a flow chart showing processing flow in an image forming processing program executed by the CPU 100 when input with an image forming processing execution instruction, and image data representing an image to be formed on the recording paper P, from the terminal device 114 via the communications interface 112. Note that in the image forming apparatus 10A according to the present first exemplary embodiment, the image forming processing program is pre-stored on the ROM 102, serving as a storage medium, however there is no limitation thereto. For example, an embodiment may be applied in which the image forming processing program is supplied in a stored state on a computer readable storage medium, such as a CD-ROM, DVD-ROM, Universal Serial Bus (USB) memory, or the like, or an embodiment may be applied in which the image forming processing program is distributed via a communications section, by wired or wireless communication.

At step 200 of FIG. 6, a rotation start instruction signal, instructing starting rotation driving of the image forming drum 44, is output to the motor controller 118. On receipt of the rotation start instruction signal, the motor controller 118 starts driving rotation of the motor 30. The image forming drum 44 thereby receives rotation driving force from the motor 30 and starts rotating in a predetermined rotation direction. Accompanying this, the code wheel 72 also starts rotating in the predetermined rotation direction.

At the next step 202, determination is made as to whether or not a predetermined duration has elapsed from when rotation of the image forming drum 44 is started until rotation velocity has attained a predetermined rotation velocity (for example, the linear velocity is 10 mm/s at a position distanced by the rotation radius $R_0$ of the image forming drum 44 from center 72A of the code wheel 72) and become stable, and standby is maintained when this duration has not elapsed.

At the next step 204, standby is maintained until a new pulse signal starts being generated by one or other of the transmission photo-sensors 74A to 74D, namely, until a rising edge of a new pulse signal is detected.

When a new rising edge of the pulse signal is detected, in the next step 206, determination is made of from which transmission photo-sensor 74 (transmission photo-sensor k) out of the transmission photo-sensors 74A to 74D the new pulse signal rising edge arose, the value of a variable i (initial set value "0") is incremented by one, indicating the number of times of rising edges of pulse signals, generated from the transmission photo-sensor k determined to have a pulse signal rising edge. Here k=1, 2, 3, or 4, where k=1 indicates the transmission photo-sensor 74A, k=2 indicates the transmission photo-sensor 74B, k=3 indicates the transmission photo-sensor 74C, and k=4 indicates the transmission photo-sensor 74D, respectively.

At the next step 210, the counter (not shown in the figures) inbuilt into the CPU 100 refers to a reference clock, and the period is detected of the transmission photo-sensor k that was determined at above step 206. Note that while an example of an embodiment is given in the present first exemplary embodiment where the period is detected employing the reference clock, there is no limitation thereto. For example, the period of the transmission photo-sensor k may be derived by subtracting, from the time $T_{ki}$ when the rising edge of the pulse signal was detected, the time $T_{ki-1}$ of the previous time a rising edge was detected for the transmission photo-sensor k that was determined at above step 206. In such cases, for example, the time of the rising edge when execution of the processing of above step 202 was completed may be employed as the initial rising edge time $T_{k0}$.

In the next step 212, the period of the transmission photo-sensor k detected at above step 210 is associated as an individual period with the transmission photo-sensor k that was determined at above step 206, and stored in time-series sequence in the NVM 106.

At the next step 214, as individual periods to be employed in calculation of a first average period, described below, determination is made as to whether or not there are individual periods detected for respective pulse signals generated from each of the respective transmission photo-sensors 74A to 74D, and whether or not the detected individual periods for each of the respective transmission photo-sensors 74A to 74D at the closest point in time to the detection time at the above step 210 have been stored in the NVM 106. When determination is negative, the process returns to step 204, and detection is made for a rising edge. However, when determination is affirmative, the process proceeds to step 216, and, as individual periods to be employed in calculation of a second average period, described below, determination is made as to whether or not there are individual periods detected for respective the pulse signals generated from each of the respective transmission photo-sensors 74A to 74D, and whether or not the detected individual periods for each of the respective transmission photo-sensors 74A to 74D at the closest point in time to the previous detection time to the detection time at the above step 210 have been stored in the NVM 106. When determination is negative the process returns to step 204, however when determination is affirmative, the process proceeds to step 218.

At step 218, acquisition is made, from the individual periods stored in the NVM 106 by processing of the above step 212, of the individual period detected most recently to the current point in time (referred to below as "first reference period") and the individual periods, for the pulse signals of each of the respective the transmission photo-sensors 74 other than the transmission photo-sensor 74 that generated the pulse signal in which the first reference period was detected, detected prior to detection of the first reference period and with a detection time closest to that of the first reference period. The average value of the acquired individual periods is computed as the first average period $E_1$. Furthermore, acquisition is made, from the individual periods stored in the NVM 106 by processing of the above step 212, of the individual period detected most recently prior to detection of the first reference period (referred to below as "second reference period") and the individual periods, for the pulse signals of each of the respective the transmission photo-sensors 74 other than the transmission photo-sensor 74 that generated the pulse signal in which the second reference period was detected, detected prior to detection of the second reference period and with a detection time closest to that of the second reference period. The average value of the acquired individual periods is computed as the second average period $E_2$.

Figure 7:
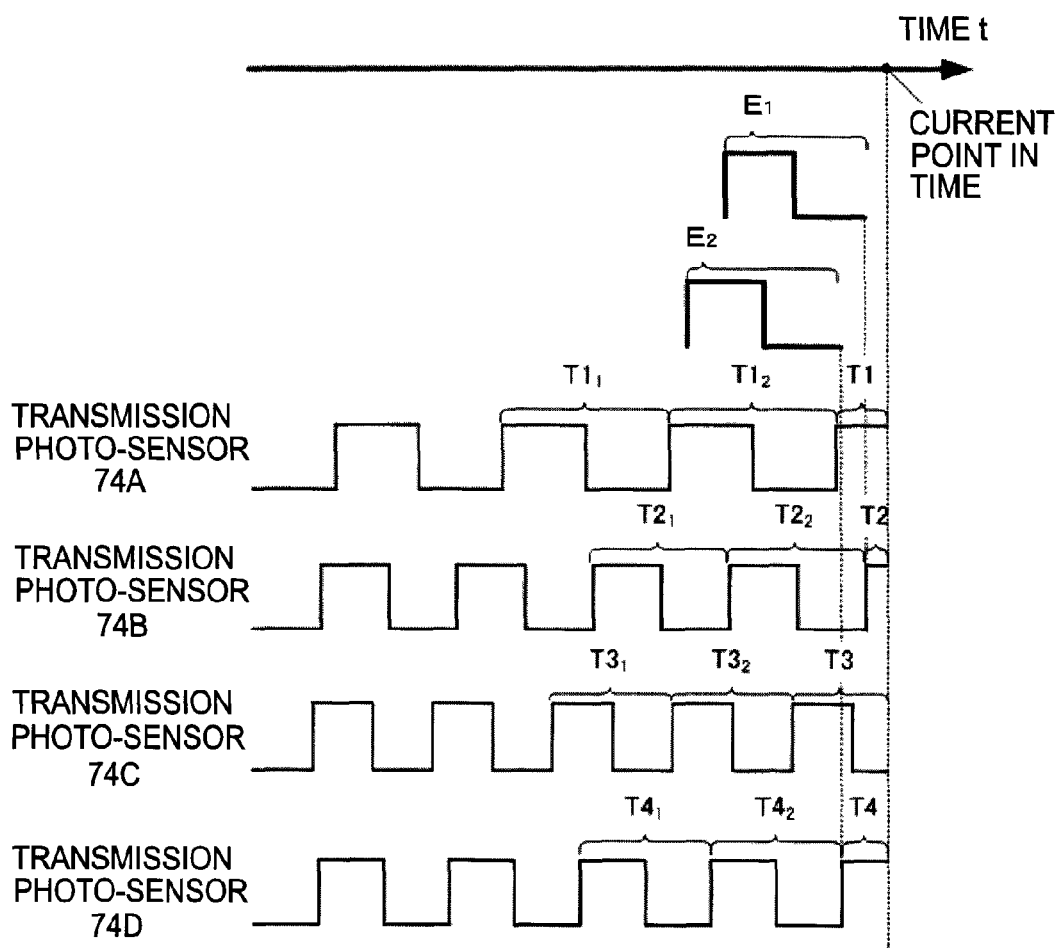
FIG. 7 is a timing chart showing waveforms of pulse signals generated by each transmission photo-sensor according to the first exemplary embodiment.

In the current step 218, for example, as shown in FIG. 7, acquisition is made, from the individual periods stored in the NVM 106 by the processing of above step 212, of an individual period $T2_2$ corresponding to the first reference period and individual periods $T1_2$, $T3_2$, $T4_2$ detected prior to detecting the individual period $T2_2$ and with detection times that are closest to the detection time of the individual period $T2_2$. The average value of the individual periods $T1_2$, $T2_2$, $T3_2$, and $T4_2$ shown in FIG. 7 is computed as the first average period $E_1$. In addition, acquisition is made, from the individual periods stored in the NVM 106 by the processing of above step 212, of the individual period $T4_2$ corresponding to the second reference period and the individual periods $T1_2$, $T2_1$ and $T3_2$ that were detected prior to detection of the individual period $T4_2$ and have detection times that are closest to the detection time of the individual period $T4_2$. The average value of the individual periods $T1_2$, $T2_1$, $T3_2$, and $T4_2$ shown in FIG. 7 is computed as the second average period $E_2$.

In the image forming apparatus 10A according to the present first exemplary embodiment, when there is no eccentricity present in the code wheel 72, any discrepancies in between the individual periods of the most recently generated pulse signals for each of the respective transmission photo-sensors 74 at a predetermined point in time lies within a permissible range. However, when there is code wheel 72 eccentricity present, discrepancy between the individual periods of the most recently generated pulse signals for each of the respective transmission photo-sensors 74 at a predetermined point in time lies outside the permissible range. Therefore, when code wheel 72 eccentricity is present, if calculation were to be made of the linear velocity of the image forming drum 44 at a position distanced by the rotation radius $R_0$ of the image forming drum 44 from the center 72A of the code wheel 72, namely calculation of the outer peripheral velocity of the image forming drum 44, by employing individual periods of pulse signals generated by a single transmission photo-sensor 74, then the outer peripheral velocity obtained from such a computation would be a value that includes a code wheel 72 eccentricity component.

So, in contrast to the outer peripheral velocity obtained by the above described computation method, in order that an outer peripheral velocity is obtained in which the code wheel 72 eccentricity component is summed, the outer peripheral velocity V of the image forming drum 44 is computed at step 220 based on the first average period $E_1$ and the second average period $E_2$ that have been obtained by computation at above step 218, the number of individual transmission photo-sensors 74, the rotation radius $R_0$ of the image forming drum 44, and the reference rotation angle $\Theta_0$. Explanation is given in the present first exemplary embodiment of a case where the reference rotation angle $\Theta_0$ and the rotation radius $R_0$ of the image forming drum 44 are pre-stored on the ROM 102.

Figure 8:
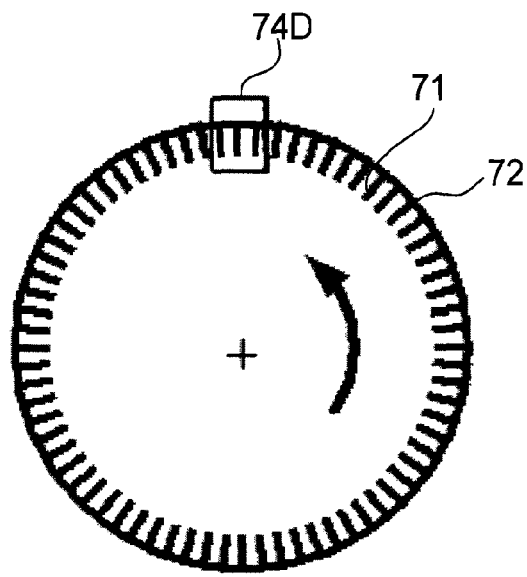
FIG. 8 is a configuration diagram showing a configuration of a rotary encoder equipped with one individual transmission photo-sensor.

Explanation follows of a method for calculating period E of the pulse signal being newly generated at the current point in time by one individual transmission photo-sensor 74D, for example as shown in FIG. 8, by employing individual periods detected from the pulse signals generated by the individual transmission photo-sensor 74D prior to the current point in time. Explanation is given where the duty ratio of the pulse signal generated by the transmission photo-sensor 74D shown in FIG. 8 is 50%.

Figure 9:
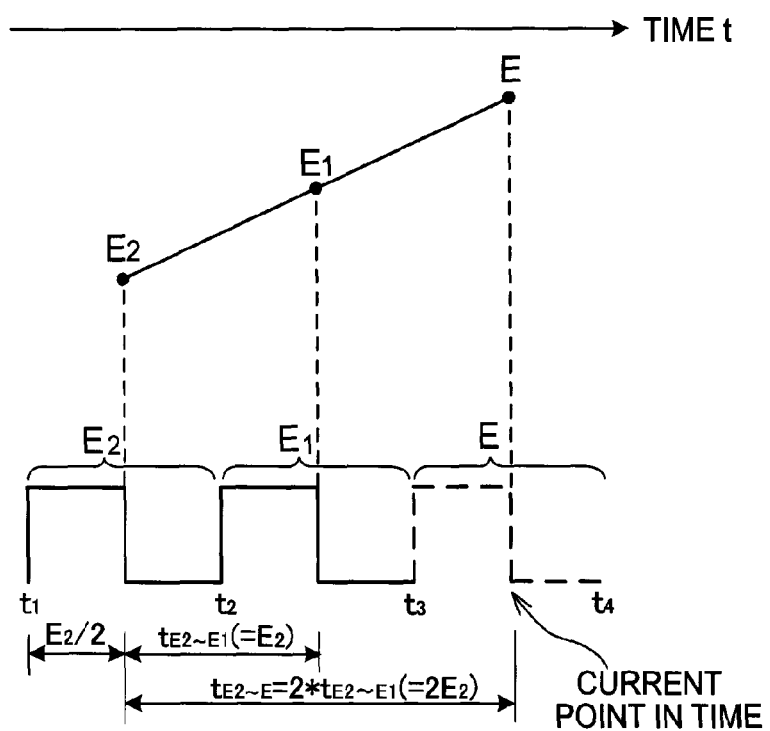
FIG. 9 is a diagram for explaining a method of calculating the period of a pulse signal being newly generated by the rotary encoder of FIG. 8.

As shown as an example in FIG. 9, from the individual periods of pulse signals generated prior to the current point in time, the first of the individual periods nearest to the time when the new pulse signal is being generated by the transmission photo-sensor 74D has an individual period $E_1$, corresponding to the above first average period $E_1$, and from the individual periods of pulse signals generated prior to the current point in time, the second of the individual periods nearest to the time when the new pulse signal is being generated by the transmission photo-sensor 74D has an individual period $E_2$, corresponding to the above second average period $E_2$. If the time interval from the rising edge of the pulse signal corresponding to the second average period $E_2$ is divided by $t_1$ to $t_4$ into time intervals of the individual period $E_2$, then the period E of the pulse signal being newly generated at the current point in time by the transmission photo-sensor 74D is represented by the following Equation (1), from linear extrapolation. Note that the symbol "*" denotes multiplication.

$$E = t_{E2\ to\ E} * (E_1 - E_2) / t_{E2\ to\ E1} + E2 \tag{1}$$

Wherein, if $t_{E2\ to\ E1} = E_2$, then $t_{E2\ to\ E} = 2 * t_{E2\ to\ E1}$ ($= 2\,E_2$), so the above Equation (1) can be represented by the following Equation (2).

$$\begin{aligned} E &= t_{E2\ to\ E} * (E_1 - E_2) / t_{E2\ to\ E1} + E_2 \\ &= 2E_2 * (E_1 - E_2) / E_2 + E_2 \\ &= 2E_1 - E_2 \end{aligned} \tag{2}$$

In this manner, the period E of a pulse signal being newly generated at the current point in time by the transmission photo-sensor 74D is calculated by the above Equation (2).

Explanation follows of a method of calculating the average period E that is the average value of the periods of the pulse signals being newly generated at the current point in time by each of the four transmission photo-sensors 74A to 74D, for example as shown in FIG. 3, employing the individual periods detected by each of the respective pulse signals generated prior to the current point in time by each of the four respective individual transmission photo-sensors 74A to 74D. Explanation is given where the duty ratio of the pulse signal generated by each of the respective transmission photo-sensors 74A to 74D shown in FIG. 3 is 50%.

Figure 10:
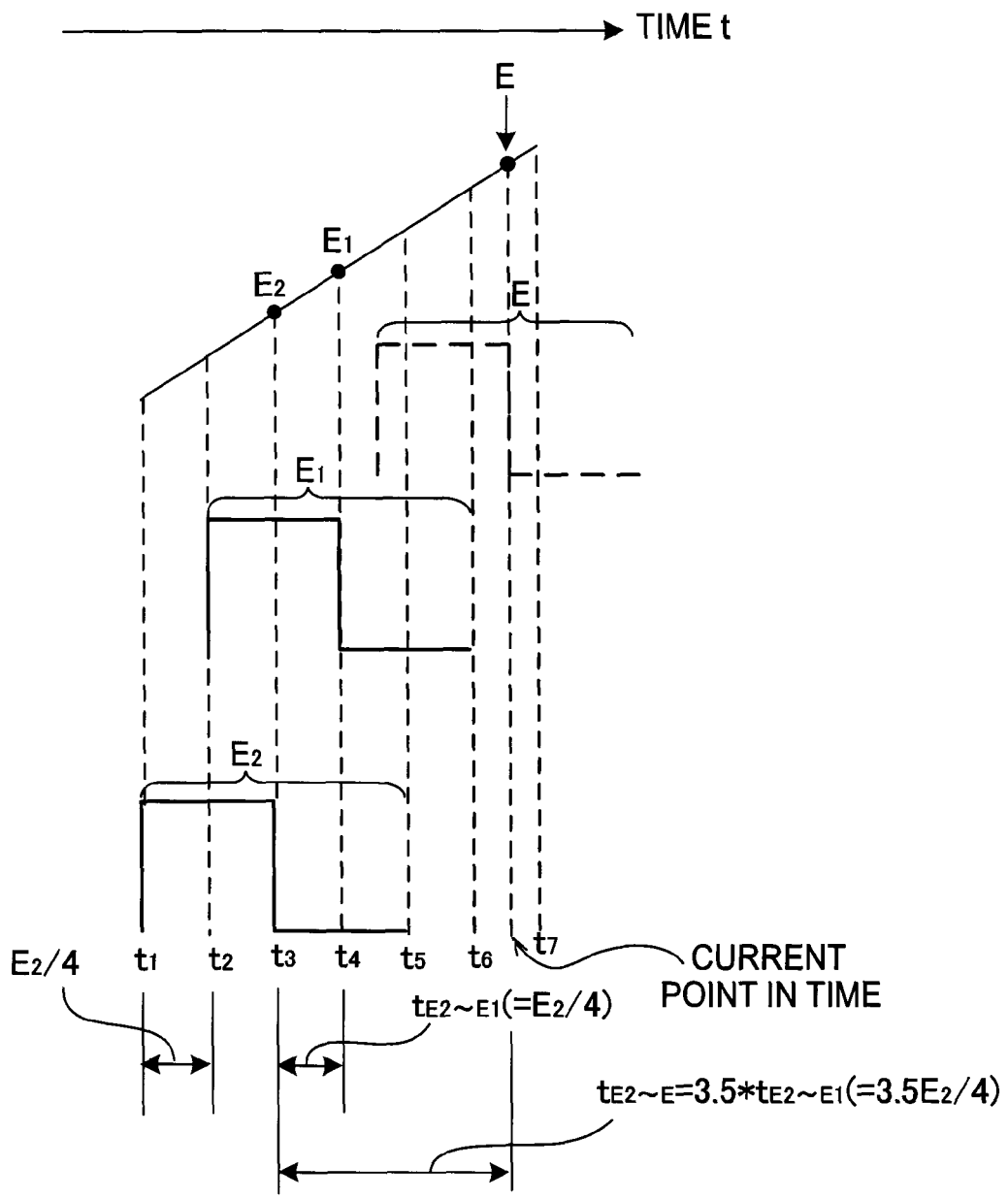
FIG. 10 is a diagram for explaining a method of calculating an average period that is an average value of periods of pulse signals being newly generated at the current point in time by the respective transmission photo-sensors of the rotary encoder shown in FIG. 3.

As shown in the example in FIG. 10, if the time interval from the rising edge of the pulse signal corresponding to the second average period $E_2$ is divided by $t_1$ to $t_7$ into time intervals of ¼ the second average period $E_2$, the average period E is represented by the above Equation (1), according to linear extrapolation.

When $t_{E2\ to\ E1} = E_2/4$, then $t_{E2\ to\ E} = 3.5 * t_{E2\ to\ E1}$ ($= 3.5\,E_2/4$), and so above Equation (1) can be represented as Equation (3) below.

$$\begin{aligned} E &= t_{E2\ to\ E} * (E_1 - E_2) / t_{E2\ to\ E1} + E_2 \\ &= (3.5 E_2 / 4) * (E_1 - E_2) / (E_2 / 4) + E_2 \\ &= 3.5 E_1 - 2.5 E_2 \end{aligned} \tag{3}$$

In this manner, the average period E of the pulse signals being newly generated at the current point in time by each of the respective transmission photo-sensors 74A to 74D is calculated from Equation (3) above.

Figure 11:
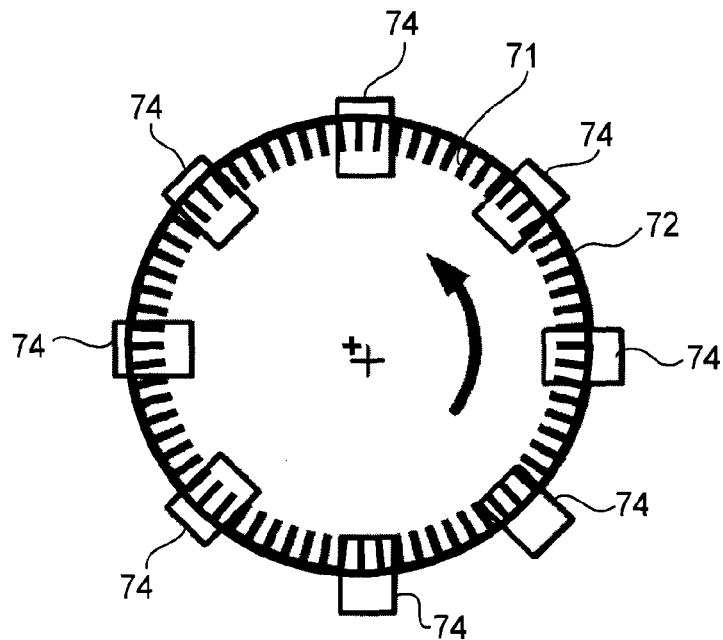
FIG. 11 is a configuration diagram showing a configuration of a rotary encoder equipped with eight individual transmission photo-sensors.

Explanation follows of a method for calculating the average period E that is the average value of the periods of the pulse signals being newly generated at the current point in time by each of eight individual respective transmission photo-sensors 74 disposed at even intervals along the peripheral direction of the code wheel 72, as shown in FIG. 11, employing the individual periods detected by each of the respective pulse signals generated prior to the current point in time by each of eight individual transmission photo-sensors 74. Explanation is given where the duty ratio of the pulse signal generated by each of the respective transmission photo-sensors shown in FIG. 11 is 50%.

Figure 12:
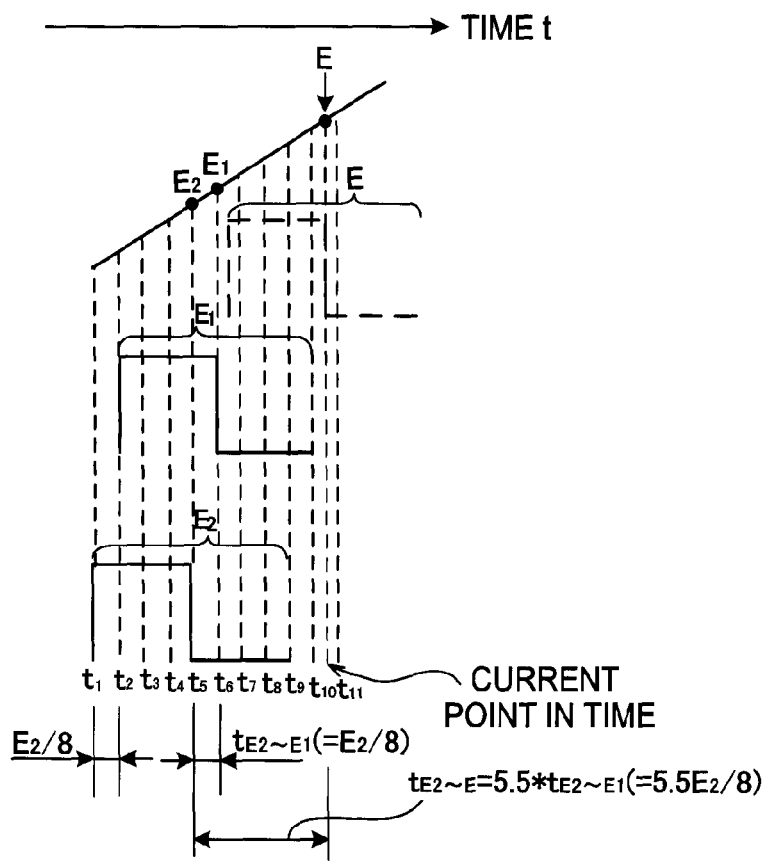
FIG. 12 is a diagram for explaining a method of calculating an average period that is an average value of periods of pulse signals being newly generated at the current point in time by the respective transmission photo-sensors of the rotary encoder shown in FIG. 11.

The method employing the eight individual transmission photo-sensors 74 shown in FIG. 11 is similar to the method when employing the transmission photo-sensors 74A to 74D. The average value of the first reference period and the individual periods, for the pulse signals of each of the respective the transmission photo-sensors 74 other than the transmission photo-sensor 74 that generated the pulse signal in which the first reference period was detected, detected prior to detection of the first reference period with a detection time closest to that of the first reference period, is computed as the first average period $E_1$. Also the average value of the second reference period and the individual periods, for the pulse signals of each of the respective the transmission photo-sensors 74 other than the transmission photo-sensor 74 that generated the pulse signal in which the second reference period was detected, detected prior to detection of the second reference period with a detection time closest to that of the second reference period, is computed as the second average period $E_2$. Then, as shown in FIG. 12, the time from the rising edge of the pulse signal corresponding to the second average period $E_2$ is divided by $t_1$ to $t_{11}$ into time intervals ⅛ of the second average period $E_2$, and the average period E is expressed by the above Equation (1), according to linear extrapolation.

Here, since $t_{E2\ to\ E1} = E_2/8$, $t_{E2\ to\ E} = 5.5 * t_{E2\ to\ E1}$ ($= 5.5\ E_2/8$), and so above Equation (1) can be expressed as Equation (4) below.

$$E = t_{E2\ to\ E} * (E_1 - E_2)/t_{E2\ to\ E1} + E_2 \quad (4)$$

$$= (5.5 E_2/8) * (E_1 - E_2)/(E_2/8) + E_2$$

$$= 5.5 E_1 - 4.5 E_2$$

In this manner, the average period E of the pulse signal being newly generated at the current point in time by each of the eight individual respective transmission photo-sensors 74 is calculated from Equation (4) above.

Equation (2) to Equation (4) above form an arithmetic progression relationship, with the first term being "$2E_1 - E_2$" and a common difference of "$0.5\ E_1 - 0.5\ E_2$". Consequently, when there are n individual transmission photo-sensors 74 disposed at even intervals along the peripheral direction of the code wheel 72, the average period $E_n$ of the pulse signal being newly generated at the current point in time by the n individual transmission photo-sensors 74 is calculated by the following Equation (5).

$$E_n = \{E_1(n+3)/2\} - \{E_2(n+1)/2\} \quad (5)$$

Explanation follows of a computation method of the outer peripheral velocity V of the image forming drum 44.

Figure 13:
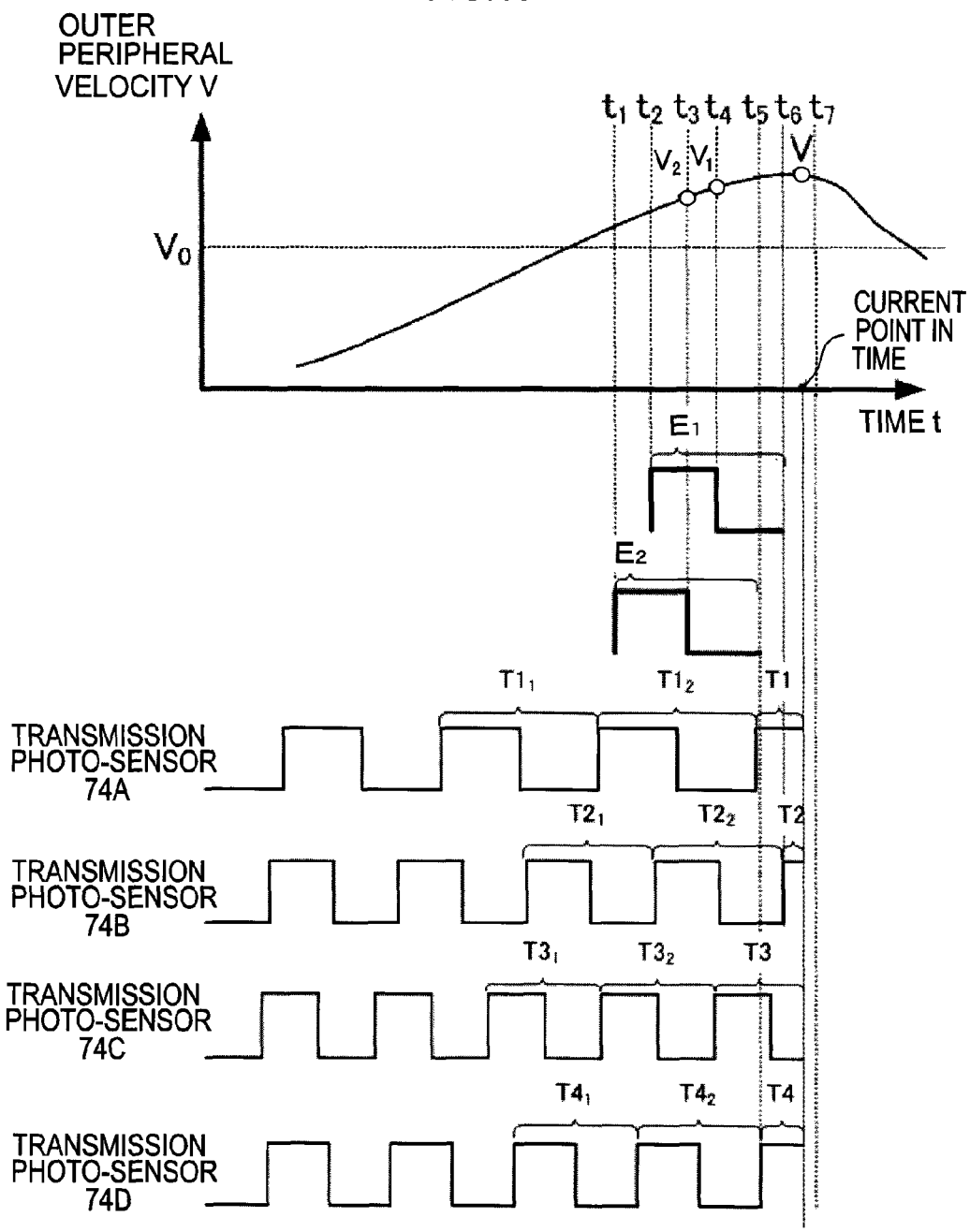
FIG. 13 is a diagram for explaining a method of calculating the outer peripheral velocity at the current point in time of an image forming drum using linear extrapolation.

As shown in an example in FIG. 13, the time from the rising edge of the pulse signal corresponding to the second average period $E_2$ is divided by $t_1$ to $t_7$ into ¼ time interval of the second average period $E_2$, the average velocity between $t_1$ to $t_5$ is the outer peripheral velocity $V_2$ ($= R_0 \Theta_0 / E_2$) computed by the second average period $E_2$, the average velocity between $t_2$ to $t_6$ is the outer peripheral velocity $V_1$ ($= R_0 \Theta_0 / E_1$) computed by the first average period $E_1$. Outer peripheral velocity $V_2$ is equivalent to the velocity of $t_3$, and outer peripheral velocity $V_1$ is equivalent to the velocity of $t_4$. The desired velocity for computation from the first average period $E_1$ and the second average period $E_2$ is the outer peripheral velocity at the current point in time, namely the outer peripheral velocity V between $t_6$ to $t_7$. The outer peripheral velocity V at the center point in time between $t_6$ and $t_7$ is expressed by the following Equation (6), by linear extrapolation.

$$V = R_0 \Theta_0 / E_n \quad (6)$$

$$= R_0 \Theta_0 / \{E_1(n+3)/2\} - \{E_2(n+1)/2\}$$

In the present first exemplary embodiment, the number n of the individual transmission photo-sensors is "4", and the above Equation (6) is expressed as the following Equation (7).

$$V = R_0 \Theta_0 / (3.5 E_1 - 2.5 E_2) \quad (7)$$

At the next step 222, according to the following Equation (8), the period P of the clock signal is computed by dividing the separation distance $X_0$ between centers of adjacent dots by the outer peripheral velocity V, and the period of the clock signal employed when ejecting ink droplets from the nozzles 48a is adjusted by resetting the period of the clock signal as this computed period P. In the present first exemplary embodiment a case is explained in which the separation distance $X_0$ between centers of adjacent dots is pre-stored on a ROM 102.

$$P = X_0 / V \quad (8)$$

$$= X_0 \{E_1(n+3)/2\} - \{E_2(n+1)/2\}/(R_0 \Theta_0)$$

$$= (3.5 E_1 - 2.5 E_2)/(R_0 \Theta_0)$$

In the present first exemplary embodiment, the outer peripheral velocity at the central point in time between $t_6$ and $t_7$ is computed as the outer peripheral velocity at the current point in time, however, for example, the outer peripheral velocity at $t_6$ may be computed as the outer peripheral velocity. In such cases, the outer peripheral velocity V at $t_6$ computed at above step 220 is expressed by the following Equation (9), and the period P of the clock signal computed at the above step 222 in such cases is expressed by the flowing Equation (10).

$$V = R_0 \Theta_0 / (3 * E_1 - 2 * E_2) \quad (9)$$

$$P = X_0 (3 * E_1 - 2 * E_2)/(R_0 \Theta_0) \quad (10)$$

As another example, the outer peripheral velocity at $t_7$ may be computed as the outer peripheral velocity at the current point in time, in such cases the outer peripheral velocity V at $t_7$ computed at above step 220 is expressed by the following Equation (11), and the period P of the clock signal computed at the above step 222 in such a case is expressed by the flowing Equation (12).

$$V = R_0 \Theta_0 / (4 * E_1 - 3 * E_2) \quad (11)$$

$$P = X_0 (4 * E_1 - 3 * E_2)(R_0 \Theta_0) \quad (12)$$

At the next step 224, the clock signal is generated with the period P obtained by the processing of above step 222, and instruction is output to the recording head controller 116 to eject ink droplets from the nozzles 48a based on the input image data, in synchronization to the generated clock signal. Thereby, the recording head controller 116 controls the inkjet recording heads 48 such that ink droplets are ejected from the nozzles 48a based on the input image data, in synchronization to the clock signal of the period P, so as to form an image expressed by the image data on the recording face of the recording paper P, without influence from changes in the conveying velocity of the recording paper P.

In the next step 226, determination is made as to whether or not forming is complete of the image expressed by the input image data, and when determination is negative the process returns to step 204. When determination is affirmative the process proceeds to step 228, and after outputting a rotation stop instruction signal to the motor controller 118 instructing rotation driving of the image forming drum 44 to be stopped, the present image forming processing program is ended. On receipt of the rotation stop instruction signal, the motor controller 118 stops rotation driving of the motor 30. Rotation driving of the image forming drum 44 is thereby stopped.

In the present first exemplary embodiment, the detection section corresponds to the processing of step 210, the computation section corresponds to the processing of step 218, the calculation section corresponds to the processing of step 220, and the adjustment section corresponds to the processing of step 222.

Second Exemplary Embodiment

Explanation follows of a second exemplary embodiment. Portions of the present second exemplary embodiment that are the same as those of the first exemplary embodiment are allocated the same reference numerals, and explanation thereof is abbreviated.

Figure 14:
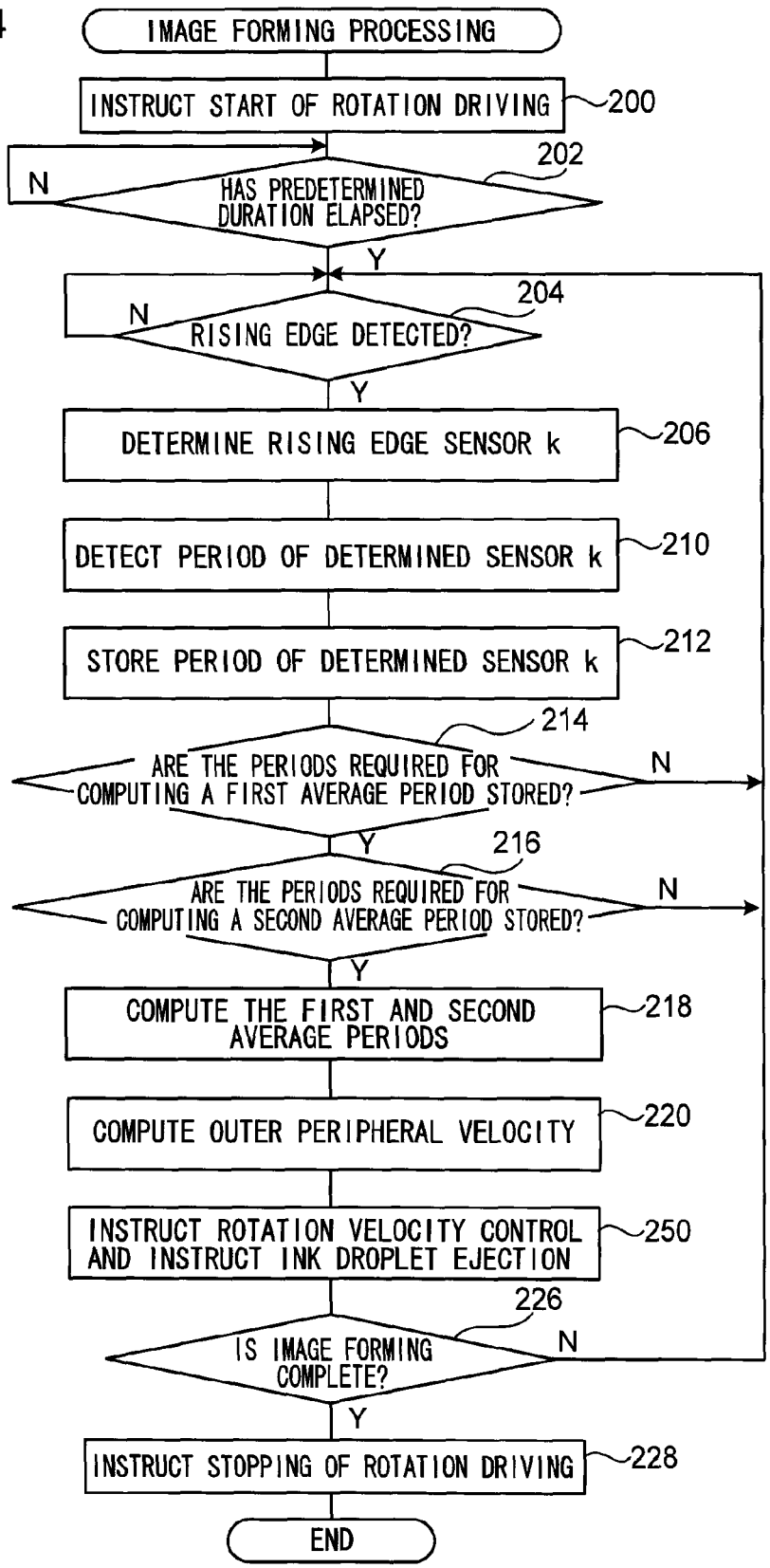
FIG. 14 is a flow chart showing process flow of an image forming processing program according to the second exemplary embodiment.

An image forming apparatus 10B of the present second exemplary embodiment differs in comparison to the image forming apparatus 10A of the first exemplary embodiment in that processing of the flow chart shown in FIG. 14 is executed by the CPU 100, in place of the processing of the flow chart shown in FIG. 6.

Explanation follows of the operation of the image forming apparatus 10B when the image forming processing according to the present second exemplary embodiment is executed, with reference to FIG. 14. FIG. 14 is a flow chart showing the process flow of an image forming processing program executed by the CPU 100 when input with an image forming processing execution instruction and image data expressing the image to be formed on the recording paper P, from the terminal device 114 via the communications interface 112. Compared to the flow chart shown in FIG. 6, the flow chart shown in FIG. 14 differs in that step 222 has been removed, and step 250 substituted in place of step 224. Steps that perform similar processing in FIG. 14 to those of the flow chart shown in FIG. 6 are allocated the same step number as in FIG. 6, and explanation thereof is abbreviated. Explanation follows regarding the processing of step 250.

At step 250 in FIG. 14, with reference to the outer peripheral velocity V obtained by the calculation of above step 220, a rotation control instruction signal is output to the motor controller 118, instructing control of rotation driving of the image forming drum 44 such that the outer peripheral velocity of the image forming drum 44 becomes that of a predetermined outer peripheral velocity, and a clock signal of a predetermined period is also generated. An instruction is output to the recording head controller 116 to eject ink droplets from the nozzles 48a based on the input image data, in synchronization with the generated clock signal. In the present second exemplary embodiment, the control section corresponds to the processing of step 250.

On receipt of the rotation control instruction signal according to the processing of above step 250, the motor controller 118 controls the rotation driving of the motor 30 such that the outer peripheral velocity of the image forming drum 44 becomes the predetermined outer peripheral velocity. Furthermore, according to the processing of above step 250 the recording head controller 116 controls the inkjet recording heads 48 so as to eject ink droplets from the nozzles 48a based on the input image data, in synchronization to the clock signal of predetermined period. Due thereto, an image expressed by the image data is formed on the recording face of the recording paper P, without influence from changes to the conveying velocity of the recording paper P.

Third Exemplary Embodiment

Explanation follows of a third exemplary embodiment. Portions of the present third exemplary embodiment that are the same as those of the first exemplary embodiment and the second exemplary embodiment are allocated the same reference numerals, and explanation thereof is abbreviated.

Figure 15:
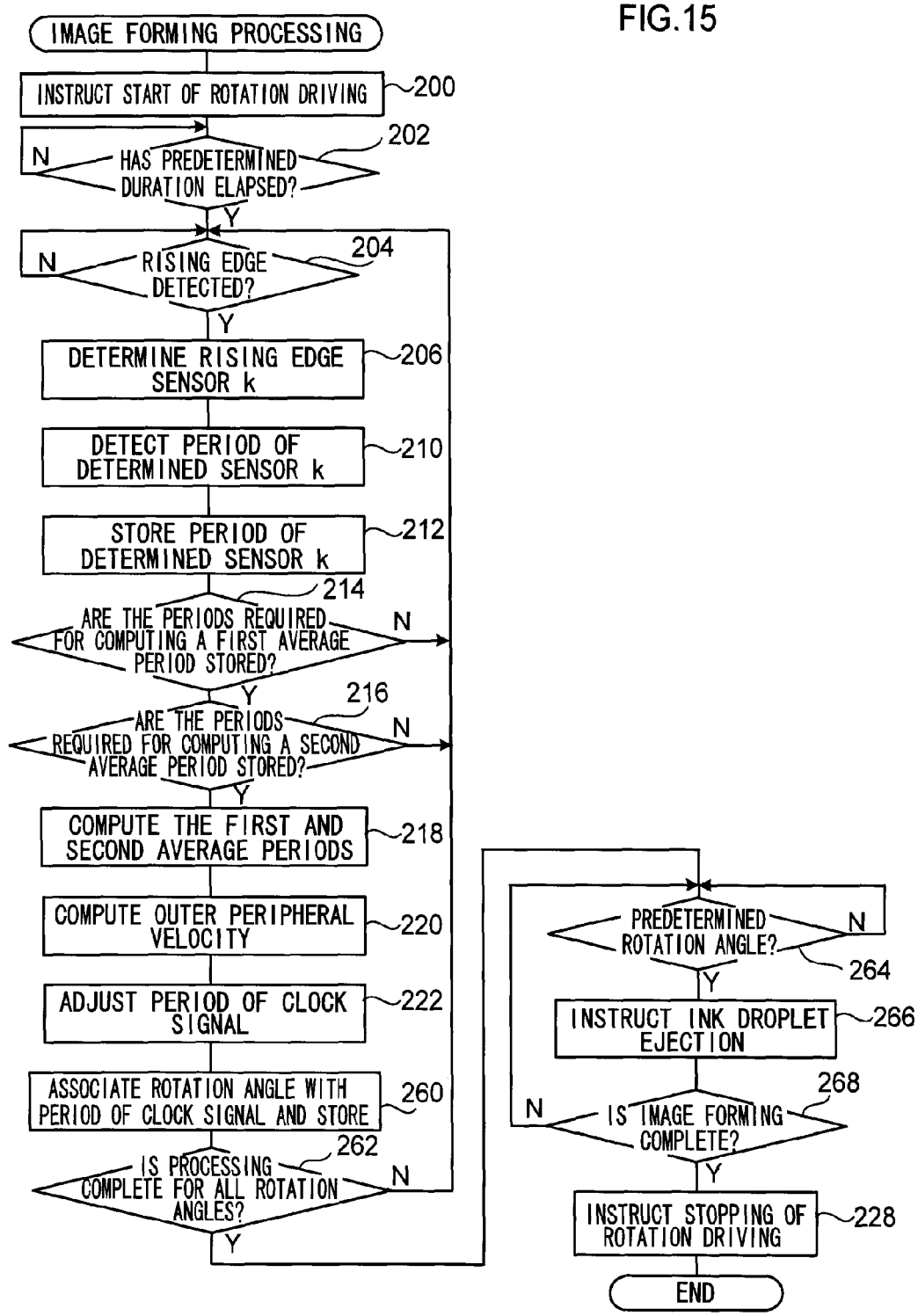
FIG. 15 is a flow chart showing process flow of an image forming processing program according to the third exemplary embodiment.

An image forming apparatus 10C (not shown in the figures) according to the present third exemplary embodiment differs in comparison to the image forming apparatus 10A of the first exemplary embodiment in that processing of the flow chart shown in FIG. 15 is executed by the CPU 100, in place of the processing of the flow chart shown in FIG. 6.

Explanation follows of the operation of the image forming apparatus 10C when the image forming processing according to the present third exemplary embodiment is executed, with reference to FIG. 15. FIG. 15 is a flow chart showing the process flow of an image forming processing program executed by the CPU 100 when input with an image forming processing execution instruction and image data expressing the image to be formed on the recording paper P, from the terminal device 114 via the communications interface 112. Compared to the flow chart shown in FIG. 6, the flow chart shown in FIG. 15 differs in that step 224 and step 226 have been removed, and steps 260 to 268 have been added. Steps that perform similar processing in FIG. 15 to those of the flow chart shown in FIG. 6 are allocated the same step number as in FIG. 6, and explanation thereof is abbreviated. Explanation follows regarding points that differ from the flow chart shown in FIG. 6.

At step 260 in FIG. 15, after associating the angle of rotation from the rotation reference position of the code wheel 72 with the period P obtained in the processing of above step 220 and storing in the NVM 106, the process proceeds to step 262.

At step 262, determination is made as to whether or not the processing of steps 204 to 222, and step 260 have been completed for all predetermined rotation angles. When determination is negative the process returns to step 204, and when determination is affirmative the process proceeds to step 264.

At step 264, after maintaining standby until the angle of rotation from the rotation reference position of the code wheel 72 arrives at one rotation angle out of all the above predetermined rotation angles, the process proceeds to step 266. At step 266, the period P corresponding to the angle of rotation from the rotation reference position of the code wheel 72 at the current point in time is read out from the NVM 106, a clock signal is generated of this period P, and an instruction is output to the recording head controller 116 instructing ink droplets to be ejected from the nozzles 48a based on the input image data, in synchronization with the generated clock signal. Due thereto, the recording head controller 116 controls the inkjet recording heads 48 so as to eject ink droplets from the nozzles 48a based on the input image data, in synchronization with the clock signal of period P, thereby forming an image expressed by the image data on the recording face of the recording paper P, without influence from changes to the conveying velocity of the recording paper P.

At the next step 268, determination is made as to whether or not forming is complete of the image expressed by the input image data. When determination is negative the process returns to step 264, and when determination is affirmative the process proceeds to step 228.

Fourth Exemplary Embodiment

Explanation follows of a fourth exemplary embodiment. Portions of the present fourth exemplary embodiment that are the same as those of the first to the third exemplary embodiment are allocated the same reference numerals, and explanation thereof is abbreviated.

Figure 16:
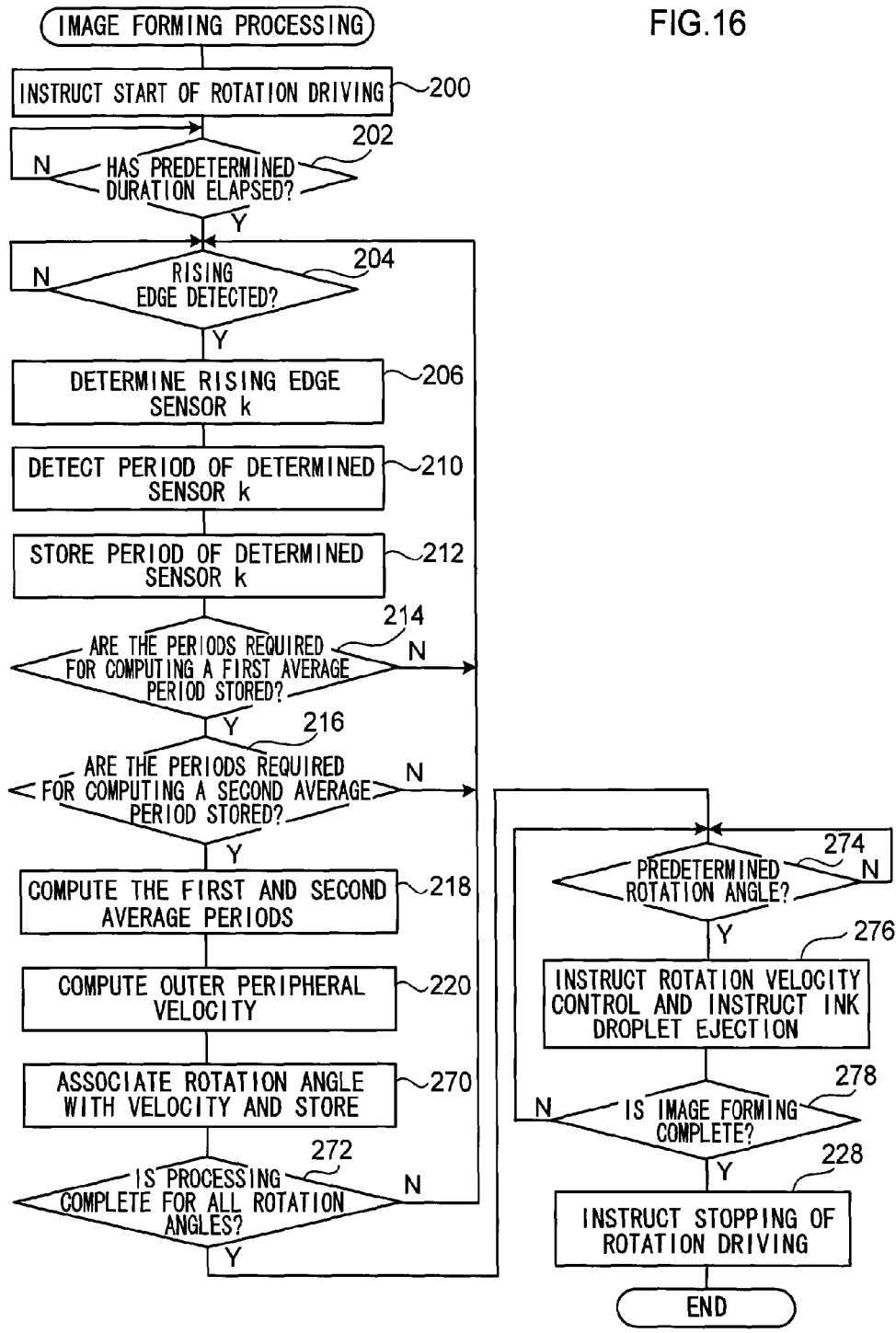
FIG. 16 is a flow chart showing process flow of an image forming processing program according to the fourth exemplary embodiment.

An image forming apparatus 10D (not shown in the figures) of the present fourth exemplary embodiment differs in comparison to the image forming apparatus 10C of the third exemplary embodiment in that processing of the flow chart shown in FIG. 16 is executed by the CPU 100, in place of the processing of the flow chart shown in FIG. 15.

Explanation follows of the operation of the image forming apparatus 10D when the image forming processing according to the present fourth exemplary embodiment is executed, with reference to FIG. 16. FIG. 16 is a flow chart showing the process flow of an image forming processing program executed by the CPU 100 when input with an image forming processing execution instruction and image data expressing the image to be formed on the recording paper P, from the terminal device 114 via the communications interface 112. Compared to the image forming processing program shown in FIG. 15, the flow chart shown in FIG. 16 differs in that step 222 and steps 260 to 268 have been removed, and steps 270 to 278 have been added. Steps that perform similar processing in FIG. 16 to those of the flow chart shown in FIG. 15 are allocated the same step number as in FIG. 15, and explanation thereof is abbreviated. Explanation follows regarding points that differ from the flow chart shown in FIG. 15.

At step 270 in FIG. 16, after associating the angle of rotation from the rotation reference position of the code wheel 72 with the outer peripheral velocity V obtained by above step 220 and storing in the NVM 106, the process proceeds to step 272.

At step 272, determination is made as to whether or not the processing of steps 204 to 220, and step 270 have been completed for all of the predetermined rotation angles. When determination is negative the process returns to step 204, and when determination is affirmative the process proceeds to step 274.

At step 274, after maintaining standby until the angle of rotation from the rotation reference position of the code wheel 72 arrives at one rotation angle out of all the above predetermined rotation angles, the process proceeds to step 276. At step 276, the outer peripheral velocity V corresponding to the angle of rotation from the rotation reference position of the code wheel 72 at the current point in time is read out from the NVM 106, and, with reference to the read-out outer peripheral velocity V, a rotation control instruction signal is output to the motor controller 118 instructing control of the rotation driving of the image forming drum 44 such that the outer peripheral velocity of the image forming drum 44 becomes that of a predetermined outer peripheral velocity, and a clock signal is also generated of a predetermined period. An instruction is output to the recording head controller 116 instructing ink droplets to be ejected from the nozzles 48a based on the input image data, in synchronization with the generated clock signal.

On receipt of the rotation control instruction signal according to the processing of above step 276, the motor controller 118 controls rotation driving of the motor 30 such that the outer peripheral velocity of the image forming drum 44 becomes that of the predetermined outer peripheral velocity. Furthermore, according to the processing of the above step 276 the recording head controller 116 controls the inkjet recording heads 48 so as to eject ink droplets from the nozzles 48a based on the input image data, in synchronization with the clock signal of predetermined period. Due thereto, an image expressed by the image data is formed on the recording face of the recording paper P, without influence from changes to the conveying velocity of the recording paper P.

At the next step 278, determination is made as to whether or not forming is complete of the image expressed by the input image data. When determination is negative the process returns to step 274, and when determination is affirmative the process proceeds to step 228.

Fifth Exemplary Embodiment

Explanation follows of a fifth exemplary embodiment. Portions in the present fifth exemplary embodiment that are similar to portions of the first to the fourth exemplary embodiments are allocated the same reference numerals, and explanation thereof is abbreviated.

Figure 17:
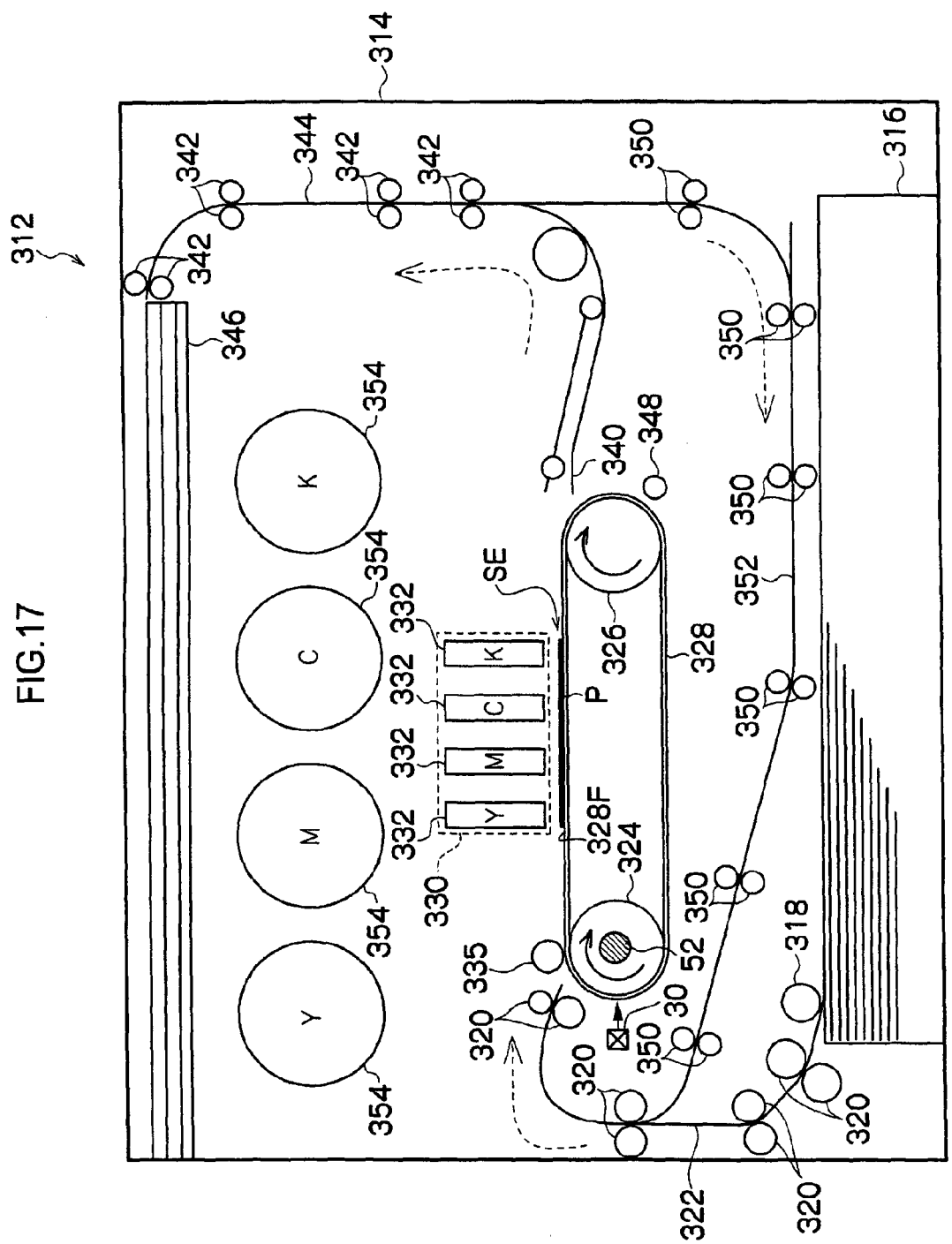
FIG. 17 is a side view showing a configuration of an image forming apparatus according to a fifth exemplary embodiment.

FIG. 17 is a side view showing a configuration of an image forming apparatus 312 according to the present fifth exemplary embodiment.

As shown in FIG. 17, the image forming apparatus 312 is equipped with a paper supply box 316 in bottom portion of a casing 314 of the image forming apparatus 312, and recording paper P that is stacked in the paper supply box 316 is taken out one sheet at a time by a pick-up roller 318. The recording paper P that has been taken out is conveyed by plural pairs of conveying rollers 320 configuring a predetermined conveying path 322. When reference is made below simply to "conveying direction", this refers to the conveying direction of the recording paper P, and "upstream" and "downstream" refer to the upstream and downstream of the conveying direction.

A conveyor belt 328 is disposed as an image conveying section above the paper supply box 316. The conveyor belt 328 is an endless shape, entrained around a drive roller 324 and a driven roller 326. Note that the conveyor belt 328 also functions as a conveying body that conveys the recording paper P so that the recording face thereof faces nozzles 48a of inkjet recording heads 332, and the conveyor belt 328 corresponds to the image forming drum 44 in each of the exemplary embodiments explained above.

The drive roller 324 receives driving force of a motor 30. The drive roller 324 is equipped with a rotary encoder 52. Note that the rotary encoder 52 according to the present fifth exemplary embodiment generates a pulse signal for detecting a predetermined rotation reference position of the drive roller 324 accompanying the rotation of the drive roller 324, and also generates a pulse signal for detecting the angle of rotation from the reference position of the drive roller 324.

A recording head array 330 is disposed above the conveyor belt 328, facing a flat portion 328F of the conveyor belt 328. This facing region is an ejection region SE where ink droplets are ejected from the recording head array 330. The recording paper P conveyed on the conveying path 322 is retained on the conveyor belt 328 and arrives at the ejection region SE, then ink droplets are applied, according to image data, from the recording head array 330 onto the recording paper P in a state facing the recording head array 330.

The recording head array 330 in the present fifth exemplary embodiment includes four of the inkjet recording heads 332 of an elongated shape having an effective recording region that is as long as the width of the recording paper P or longer, disposed along the conveying direction. The inkjet recording heads 332 correspond to each of four colors, Y, M, C, and K so as to form color images. Each of the inkjet recording heads 332 is of a similar configuration to that of the inkjet recording heads 48 explained in the first exemplary embodiment, and has nozzles 48a similar to the inkjet recording heads 48. Operation of each of the inkjet recording heads 332 is controlled by a recording head controller 116 as explained in the first exemplary embodiment.

A charging roller 335 is disposed at the upstream side of the recording head array 330, and a power source (not shown in the figures) is connected to the charging roller 335. The charging roller 335 follows the drive roller 324, while nipping the conveyor belt 328 and the recording paper P between the charging roller 335 and the drive roller 324, moving the recording paper P between a pressing position where the recording paper P is pressed against the conveyor belt 328 and a separation position where the recording paper P is separated from the conveyor belt 328. Charge is imparted to the recording paper P at the pressing position, and the recording paper P is electrostatically attracted onto the conveyor belt 328.

A release blade 340 is disposed further to the downstream side than the recording head array 330, formed, for example, from an aluminum blade, and the recording paper P is thereby released from the conveyor belt 328. The released recording paper P is conveyed by plural discharge roller pairs 342 configuring a discharge path 344 at the downstream side of the release blade 340, and the recording paper P is discharged to a discharge paper tray 346 provided at a top portion of the casing 314.

A cleaning roller 348 is disposed below the release blade 340, with the conveyor belt 328 disposed between the cleaning roller 348 and the driven roller 326, and the surface of the conveyor belt 328 is cleaned by the cleaning roller 348.

A reversing path 352 configured from plural reversing roller pairs 350 is provided between the paper supply box 316 and the conveyor belt 328, such that image recording is readily performed to both sides of the recording paper P, by reversing recording paper P that has an image recorded on one side thereof and retaining it back on the conveyor belt 328.

Ink tanks 354, storing ink of each of the four colors, are provided between the conveyor belt 328 and the discharge paper tray 346. The ink from the ink tanks 354 is supplied to the recording head array 330 by ink feed tubes (not shown in the figures).

Figure 18:
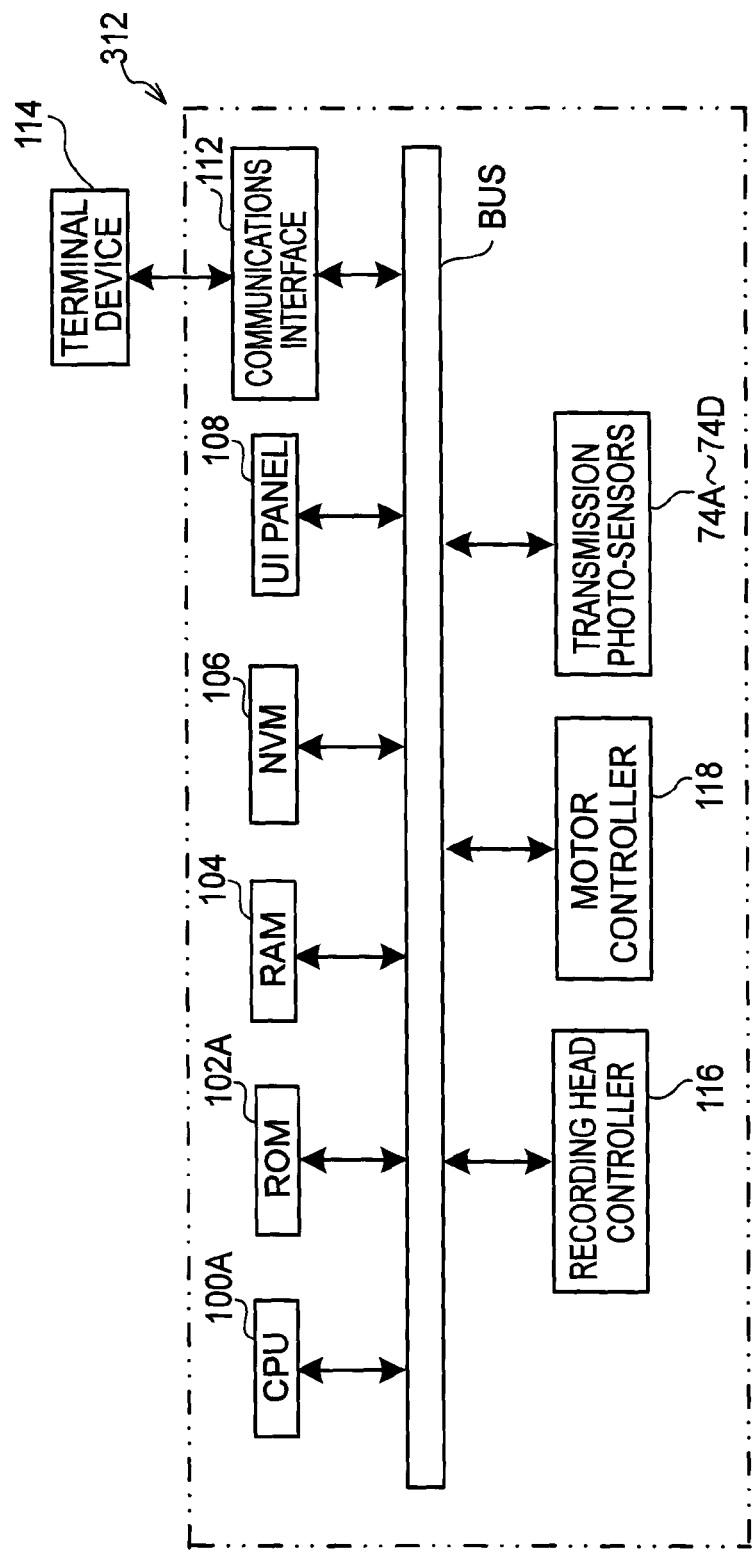
FIG. 18 is a block diagram showing relevant parts of a configuration of an electrical system of an image forming apparatus according to the fifth exemplary embodiments.

FIG. 18 is a block diagram showing relevant portions of a configuration of an electrical system of the image forming apparatus 312 according to the present fifth exemplary embodiment. In the following, similar configuration elements to those of FIG. 4 are allocated the same reference numerals, and explanation thereof is abbreviated.

The image forming apparatus 312 differs in comparison to the image forming apparatus 10A of the above first exemplary embodiment in that a CPU 100A is employed in place of the CPU 100, and a ROM 102A is employed in place of the ROM 102. The CPU 100A controls the operation of the image forming apparatus 312 overall. The ROM 102A, differs with respect to the ROM 102 in that it is stored with a control program that controls the operation of the image forming apparatus 312, in place of the control program that controls the operation of the image forming apparatus 10A, and is stored with a rotation radius $R_0$ that corresponds to the separation distance between the surface of the conveyor belt 328, on the outer peripheral face of the drive roller 324, and the axial center of the drive roller 324, in place of the rotation radius $R_0$ of the image forming drum 44.

Explanation follows of the operation of the image forming apparatus 312 according to the present fifth exemplary embodiment.

In the image forming apparatus 312 according to the present fifth exemplary embodiment, the recording paper P taken out from the paper supply box 316 is conveyed and arrives at the conveyor belt 328. The recording paper P is then pressed against the conveyor belt 328 by the charging roller 335, and retained attracted to the conveyor belt 328 by application of voltage from the charging roller 335. Ink droplets are ejected from the recording head array 330 in this state, while the recording paper P is gradually passing the ejection region SE due to circulation of the conveyor belt, forming an image on the recording paper P.

However, the conveying velocity of the recording paper P retained on the surface of the conveyor belt 328 fluctuates, for example due to eccentricity of the drive roller 324. In this state, with the conveying velocity of the recording paper P on the conveyor belt 328 fluctuating, if a clock signal for synchronizing to the pulse signal generated by the rotary encoder 52 were to be output to the inkjet recording heads 332, then ink droplets ejected from the nozzles 48a of the inkjet recording heads 332 would be synchronized to the clock signal, and the image formed by the ink droplets would be distorted.

In the image forming apparatus 312 according to the present fifth exemplary embodiment, image forming processing is executed for forming an image on the recording paper P, while suppressing distortion of the image due to the drive roller 324 eccentricity.

In the present fifth exemplary embodiment, processing of the flow chart shown in FIG. 6 is executed by the CPU 100A when an instruction to execute image forming processing and image data expressing the image to be formed on the recording paper P are input, from the terminal device 114 via the communications interface 112, however there is no limitation thereto, and processing of the flow charts shown in FIG. 14, FIG. 15, or FIG. 16 may be executed.

In some of the above exemplary embodiments, explanation is given of examples of embodiments where the periods of the pulse signals generated by each of the respective four individual transmission photo-sensors 74A to 74D are detected as the individual periods, and the outer peripheral velocity V of the image forming drum 44 is computed employing the detected individual periods, however there is no limitation thereto. For example, two individual transmission photo-sensors may be employed to generate pulse signals of different phases, a phase A and a phase B, accompanying rotation of the image forming drum 44, the pulse signals generated with phase A and phase B by each of the respective transmission photo-sensors detected as the individual periods, and the detected individual periods employed to compute the outer peripheral velocity V of the image forming drum 44. In such cases, for example, after a period of time has elapsed from when rotation of the image forming drum 44 is started until the rotation velocity has attained a predetermined rotation velocity (for example, the outer peripheral velocity of the image forming drum 44 is 10 mm/s) and become stable, and the period of the pulse signals of phase A and phase B, generated by the transmission photo-sensor 74A' and 74B' disposed facing each other with the code wheel 72 in between, as shown in FIG. 19, detected as the individual periods. Average values $E_{1A}$ and $E_{2A}$ are computed of periods, from the detected periods, of mutually corresponding pulse signals of one pulse worth, according to the following Equation (13) and Equation (14). Then, using the average values $E_{1A}$ and $E_{2A}$, the outer peripheral velocity V of the image forming drum 44 at the current point in time is computed by the following Equation (15), according to liner extrapolation. Equation (13) is mathematical expression for computing, as the first average period $E_{1A}$, the average value of the acquired individual period $T1_2$ and individual period $T2_2$, wherein the individual period $T1_2$ acquired corresponds to the first reference period and the individual period $T2_2$ acquired is detected prior to detecting the individual period $T1_2$ and has a detection time that is nearest to the detection time of the individual period $T1_2$. Equation (14) is a mathematical expression that computes, as the second average period $E_{2A}$, the average value of acquired individual periods $T2_2$ and individual period $T1_1$, wherein the individual period $T2_2$ acquired corresponds to the second reference period, and the individual period $T1_1$ acquired is detected prior to detecting the individual period $T2_2$ and has a detection time that is nearest to the detection time of the individual period $T2_2$. In Equation (15) n represents the number of individual photo-sensors and m represents a multiplier.

$$E_{1A}=(T2_2+T1_2)/2 \tag{13}$$

$$E_{2A}=(T2_2+T1_1)/2 \tag{14}$$

$$V=R_0\Theta_0/\{E_{1A}(n*m+3)/2-E_{2A}(n*m+1)/2\} \tag{15}$$

In the example shown in FIG. 19, the number of individual transmission photo-sensors is "2", and the multiplier is "4", therefore the outer peripheral velocity V of the image forming drum 44 at the current point in time is represented by Equation (16).

$$V=R_0\Theta_0/(5.5E_{1A}-4.5E_{2A}) \tag{16}$$

Furthermore, explanation is given in some of the above exemplary embodiments of embodiments in cases where the four individual transmission photo-sensors 74A to 74D are employed, however there is no limitation thereto. For example, as shown in FIG. 11, eight individual transmission photo-sensors 74 may be employed to detect the slits 71. In such a manner, plural of the transmission photo-sensors 74 may be employed to detect the slits 71. In such cases, the plural transmission photo-sensors 74 may be disposed such that an average value (for example $E_1$ or $E_2$) of the individual periods of the pulse signals generated by the respective transmission photo-sensors 74 is a value within a predetermined range (of periods lying within a predetermined permissible range for the quality of image forming occurring due to code wheel 72) that includes the individual periods of the pulse signals generated by each of the transmission photo-sensors 74 when there is no code wheel 72 eccentricity present.

Furthermore, in each of the above exemplary embodiments, the processing of above step 218 is: acquiring, from the individual periods stored in the NVM 106 by processing of the above step 212, the first reference period and the individual periods, for the pulse signals of each of the respective the transmission photo-sensors 74 other than the transmission photo-sensor 74 that generated the pulse signal in which the first reference period was detected, detected prior to detection of the first reference period with a detection time closest to that of the first reference period; computing the average value of these acquired individual periods as the first average period; acquiring, from the individual periods stored in the NVM 106 by processing of the above step 212, the second reference period and the individual periods, for the pulse signals of each of the respective the transmission photo-sensors 74 other than the transmission photo-sensor 74 that generated the pulse signal in which the second reference period was detected, detected prior to detection of the second reference period with a detection time closest to that of the second reference period; and computing the average value of these acquired individual periods as the second average period. However, there is no limitation thereto, and, for example, processing may be performed as the processing of above step 218 of: acquiring, from the individual periods stored in the NVM 106 by processing of the above step 212, the second reference period and the individual periods, for the pulse signals of each of the respective the transmission photo-sensors 74 other than the transmission photo-sensor 74 that generated the pulse signal in which the second reference period was detected, detected prior to detection of the second reference period with a detection time closest to that of the second reference period; computing the average value of these acquired individual periods as the first average period; acquiring as a third reference period, from the individual periods stored in the NVM 106 by processing of the above step 212, the most recently detected individual period prior to detecting the second reference period and the individual periods, for the pulse signals of each of the respective the transmission photo-sensors 74 other than the transmission photo-sensor 74 that generated the pulse signal in which the third reference period was detected, detected prior to detection of the third reference period with a detection time closest to that of the third reference period; and computing the average value of these acquired individual periods as the second average period.

In this manner reference periods may be acquired that are the respective individual periods most recently detected at plural predetermined points in time prior to the current point in time for one or other of the transmission photo-sensors 74, and individual periods acquired of the pulse signals of the other transmission photo-sensors 74 detected prior to the respective reference period and having a detection time that is closest to the detection time of the reference period.

Furthermore, in each of the above exemplary embodiments, the outer peripheral velocity V at the current point in time is computed by linear extrapolation using two average values, however there is no limitation thereto. For example, the outer peripheral velocity V at the current point in time may be computed by linear extrapolation using three or more average values. For example, in a case where three or more average values are employed, an average of an outer peripheral velocity computed employing the first average value and the second average value, an outer peripheral velocity computed employing the first average value and the third average value, and an outer peripheral velocity computed employing the second average value and the third average value, may be taken as the outer peripheral velocity V at the current point in time.

In each of the above exemplary embodiments, the outer peripheral velocity V of the image forming drum 44 is computed as the velocity relating to rotation of the image forming drum 44 at the current point in time, however there is no limitation thereto, and, for example, the angular velocity ω of the image forming drum 44 at the current point in time may be computed. In such cases, the angular velocity of the image forming drum 44 is computed according to the following Equation (17).

$$\omega=\Theta_0/\{E_1(n+3)/2-E_2(n+1)/2\} \tag{17}$$

In each of the above exemplary embodiments, the rotation radius $R_0$ does not change, however there is no limitation thereto, and, for example, the rotation radius $R_0$ may be variable. Such cases, include, for example, an embodiment in which the rotation radius $R_0$ is changed according to the thickness of the recording paper P on which an image is formed.

Furthermore, in each of the above exemplary embodiments, explanation is given of embodiments in cases where an image forming program is executed by a CPU, however there is no limitation thereto. For example, with the aim of reducing processing load on the CPU and raising overall processing speed, a Field Programmable Gate Array (FPGA) may be connected to the BUS, and processing related to computing the period of the pulse signals in the image forming processing program (for example, step 204 to step 220 shown in FIG. 6) may be executed by the FPGA, with other processing executed by the CPU. Furthermore, a pulse generator may be connected to the BUS, with the pulse generator generating the clock signal of period P computed by the CPU.

Furthermore, in each of the above exemplary embodiments, explanation is given of examples of embodiments in cases where the outer peripheral velocity V is calculated by computation employing a computation formula, however there is no limitation thereto. For example, the first average period $E_1$, the second average period $E_2$, the rotation radius $R_0$, the reference rotation angle $\Theta_0$, and the number of n individual transmission photo-sensors 74 may be input to a table for outputting the outer peripheral velocity V, and the table pre-stored on a storage medium, such as, for example, the ROM102, 102A or the like, and calculation made by deriving the outer peripheral velocity V using this table. Also with respect to the period P of the clock signal, the outer peripheral velocity V and the separation distance $X_0$ between the centers of adjacent dots may be input to a table for outputting the period P of the clock signal, and this table pre-stored on a storage medium, such as, for example, the ROM102, 102A or the like, and the period P derived using this table.

Furthermore, in each of the above exemplary embodiments, explanation is given of examples of an image forming apparatus of embodiments in which an image is directly formed on the recording paper P by the inkjet recording heads, however there is no limitation thereto. Image forming apparatuses may be of embodiments in which an image is formed on the recording paper P via an intermediate transfer body. Examples of embodiments in such cases include, for example, an image forming apparatus in which a latent image is formed on the outer peripheral surface (predetermined face) of a photoreceptor drum, this being a rotating body, using a recording head equipped with light emitting elements such as, for example Light Emitting Diodes (LED's) or the like, a toner image of the latent image is made, and then the toner image is transferred onto the recording face (surface) of recording paper.

Furthermore, in the above exemplary embodiments, the transmission photo-sensors 74A to 74D detect fluctuations in the amount of light, so as to generate pulse signals according to the detected fluctuations in the amount of light, however there is no limitation thereto. For example: in place of the slits 71, reflection plates with a higher light reflectivity than that of other regions of the code wheel 72 may be provided; reflection photo-sensors, each configured with a light emitting element and a light receiving element that receives the light emitted from the light emitting element and reflected by the reflection plates, may be employed in place of the transmission photo-sensors 74A to 74D; fluctuations in the amount of light detected with the refection photo-sensors; and pulse signals generated. Furthermore, magnets may be provided in place of the slits 71, magnetic sensors employed in place of photo-sensors, fluctuations in magnetism detected by the magnetic sensors and pulse signals generated.

In this manner, the rotary encoder 52 may be configured with: plural detected portions disposed substantially evenly spaced around the circumferential direction of the code wheel 72, such that a predetermined difference or greater occurs in the size of a given physical characteristic between the detected portions and other regions of the code wheel 72; and a pulse signal generation section that, accompanying rotation of the code wheel 72, detects the size of the difference in the given physical characteristic between the plural detected portions and the regions of the code wheel 72 other than the detected portions, and generates a pulse signal according to the detected difference.

Furthermore, in each of the above exemplary embodiments, the inkjet recording heads 48, 332 have a structure in which the plural nozzles 48a are arranged in two rows such that the nozzles 48a do not overlap along the slow scanning direction, however there is no limitation thereto. The inkjet recording head 48, 332 may have any structure in which the nozzles 48a are disposed in two dimensions so as not to overlap along the slow scanning direction.

What is claimed is:

1. A velocity calculation device comprising:
   a rotation body provided with a plurality of detected portions disposed along a rotation direction at predetermined rotation angle intervals;
   a plurality of generating sections that each respectively generate a pulse signal according to passing of each of the plurality of detected portions accompanying rotation of the rotation body;
   a detection section that detects as individual periods, based on each of the pulse signals generated by the plurality of generating sections, periods of each of the pulse signals of the plurality of generating sections;
   a computation section that, using as a reference period at each of a plurality of predetermined points in time the individual period detected most recently by the detection section for one or other of the plurality of generating sections, computes for each of the reference periods an average value of the reference period and one or more individual periods for other generating sections of the plurality of generating sections, detected separately prior to detecting the respective reference period for pulse signals nearest to the reference period; and
   a calculation section that calculates a velocity related to rotation of the rotation body based on the plurality of average values computed by the computation section, the number of individual generating sections, and the predetermined rotation angle.

2. The velocity calculation device of claim 1 wherein, when a new pulse signal is being generated by one of the generating sections, with a first reference period being the individual period most recently detected by the detection section, and a second reference period being the individual period detected most recently prior to the first reference period, the computation section:
   computes, as a first average period, an average value of the first reference period and the one or more individual periods for generating sections of the plurality of generating sections other than the generating section that generated the pulse signal from which the first reference period was detected, separately detected prior to detecting the first reference period and being the individual period of the pulse signal having a detection time that is closest to the first reference period, and;

computes, as a second average period, an average value of the second reference period and the one or more individual period for generating sections of the plurality of generating sections other than the generating section that generated the pulse signal from which the second reference period was detected, separately detected prior to detecting the second reference period and being the individual periods of the pulse signals having a detection time that is closest to the second reference period.

3. The velocity calculation device of claim 1 wherein the plurality of generating sections are disposed such that the average values are values that lie within a predetermined range.

4. An image forming apparatus comprising:
   the velocity calculation device of claim 1;
   a recording head comprising a plurality of image forming elements that form configuration units configuring respective images on a predetermined surface in synchronization with a clock signal;
   an image conveying section that conveys an image by functioning as either a transfer body that rotates in synchronization with rotational operation of the rotation body and transfers an image formed on a peripheral face of the transfer body by the image forming elements onto a surface of a recording medium, or a conveying body that rotates in synchronization with the rotational operation of the rotation body and conveys a recording medium such that a surface of the recording medium and the image forming elements face each other, while the recording medium is in a retained state on the peripheral face of the conveying body; and
   an adjustment section that adjusts the period of the clock signal based on the velocity calculated by the calculation section and a distance between adjacent configuration units.

5. An image forming apparatus comprising:
   the velocity calculation device of claim 1;
   a recording head comprising a plurality of image forming elements that form configuration units configuring respective images on a predetermined surface;
   an image conveying section that conveys an image by functioning as either a transfer body that rotates in synchronization with rotational operation of the rotation body and transfers an image formed on a peripheral face of the transfer body by the image forming elements onto a surface of the recording medium, or a conveying body that rotates in synchronization with the rotational operation of the rotation body and conveys a recording medium such that a surface of the recording medium and the image forming elements face each other, while the recording medium is in a retained state on the peripheral face of the conveying body; and
   a control section that controls rotation of the rotation body based on the velocity calculated by the calculation section such that the velocity related to rotation of the rotation body becomes a predetermined velocity.

6. A non-transitory computer readable storage medium stored with a computer program, the computer program causing a computer to function as:
   a detection section that detects, as individual periods, the periods of each pulse signal of a plurality of generating sections that generate respective pulse signals according to passing of respective detected portions disposed along the rotation direction at predetermined rotation angle intervals on a rotation body accompanying rotation of the rotation body, wherein detection is based on each pulse signal generated by the plurality of generating sections;
   a computation section that, using as a reference period at each of a plurality of predetermined points in time the individual period detected most recently by the detection section for one or other of the plurality of generating sections, computes for each of the reference periods an average value of the reference period and one or more individual periods for other generating sections of the plurality of generating sections, detected separately prior to detecting the respective reference period for pulse signals nearest to the reference period; and
   a calculation section that calculates a velocity related to rotation of the rotation body based on the plurality of average values computed by the computation section, the number of individual generating sections, and the predetermined rotation angle.

* * * * *